United States Patent [19]

Hiniker et al.

[11] Patent Number: 4,530,463
[45] Date of Patent: Jul. 23, 1985

[54] CONTROL METHOD AND APPARATUS FOR LIQUID DISTRIBUTOR

[75] Inventors: Thomas K. Hiniker, Mankato; Vincent N. Bush, Madison Lake, Minn.

[73] Assignee: Hiniker Company, Mankato, Minn.

[21] Appl. No.: 405,323

[22] Filed: Aug. 5, 1982

[51] Int. Cl.³ .............................................. A01M 7/00
[52] U.S. Cl. ...................................... 239/71; 239/76; 239/155
[58] Field of Search ...................... 239/62, 75, 76, 155, 239/156, 161, 163, 164, 166, 167, 168, 170, 69, 71

[56] References Cited

U.S. PATENT DOCUMENTS

| | | | |
|---|---|---|---|
| 3,301,487 | 1/1967 | Young | 239/168 |
| 3,344,993 | 10/1967 | Wilder et al. | 239/164 |
| 3,366,281 | 1/1968 | Wilder | 222/177 |
| 3,419,221 | 12/1968 | Fyrk | 239/656 |
| 3,511,411 | 5/1970 | Weiss | 222/52 |
| 3,539,106 | 11/1970 | Ramik | 239/569 |
| 3,550,866 | 12/1970 | Swenson | 239/677 |
| 3,782,634 | 1/1974 | Herman | 239/163 |
| 3,792,709 | 2/1974 | Johnson, Jr. et al. | 137/47 |
| 3,877,645 | 4/1975 | Oligschlaeger | 239/164 |
| 3,949,207 | 4/1976 | Savary et al. | 235/151.34 |
| 4,052,003 | 10/1977 | Steffen | 239/71 |
| 4,116,138 | 9/1978 | McFarland et al. | 111/7 |
| 4,197,995 | 4/1980 | Campbell et al. | 239/74 |
| 4,220,998 | 9/1980 | Kays | 239/156 |
| 4,252,274 | 2/1981 | Kubacak | 239/163 |
| 4,277,022 | 6/1981 | Holdsworth et al. | 239/156 |
| 4,392,611 | 6/1983 | Bachman et al. | 239/155 |

OTHER PUBLICATIONS

"Controlled Spraying" Brochure-Dickey-john Corporation, Auburn, Illinois.

Primary Examiner—Andres Kashnikow
Assistant Examiner—Scott D. Malpede
Attorney, Agent, or Firm—Burd, Bartz & Gutenkauf

[57] ABSTRACT

A liquid sprayer has a tank for storing liquid, a boom supporting spraying nozzles, and a pump and liquid control system for supply liquid under pressure to the spraying nozzles in a manner that maintains substantially uniform liquid dispensing density independent of the ground speed of the sprayer. A ground speed sensor, a liquid pressure sensor, and a liquid flow meter send signals to a controller to regulate a valve that controls the rate of flow of liquid to the spray nozzles.

51 Claims, 17 Drawing Figures

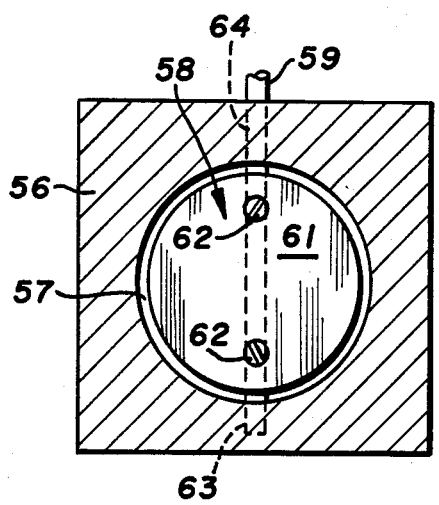
*FIG.5*
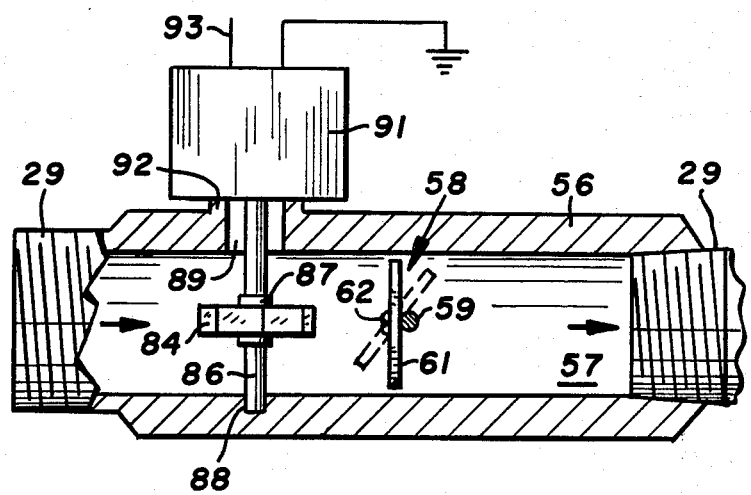
*FIG.6*
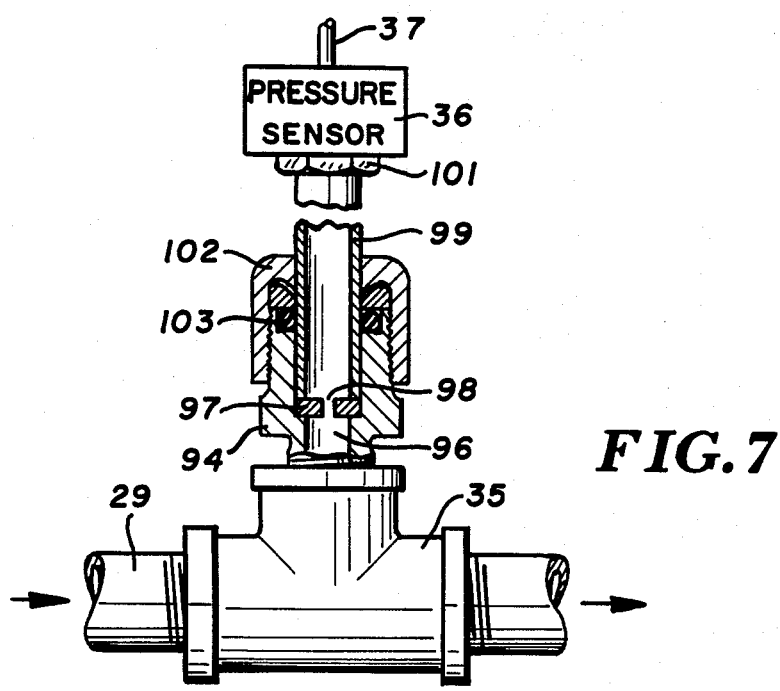
*FIG.7*
| Fig.8A | Fig.8B | Fig.8C |
| --- | --- | --- |
| Fig.8D | Fig.8E | Fig.8F |
| Fig.8G | Fig.8H | Fig.8I |
*FIG.8*

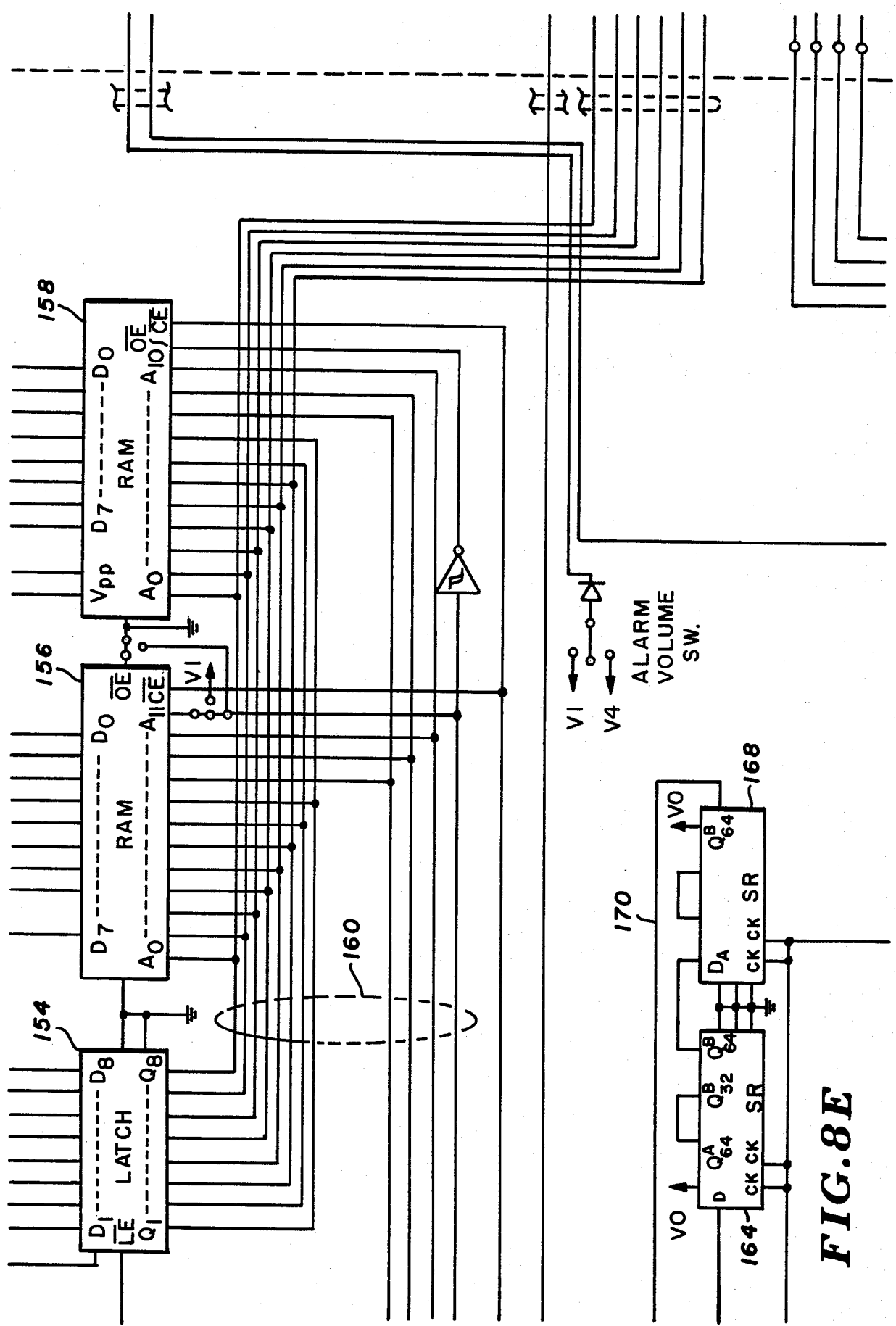

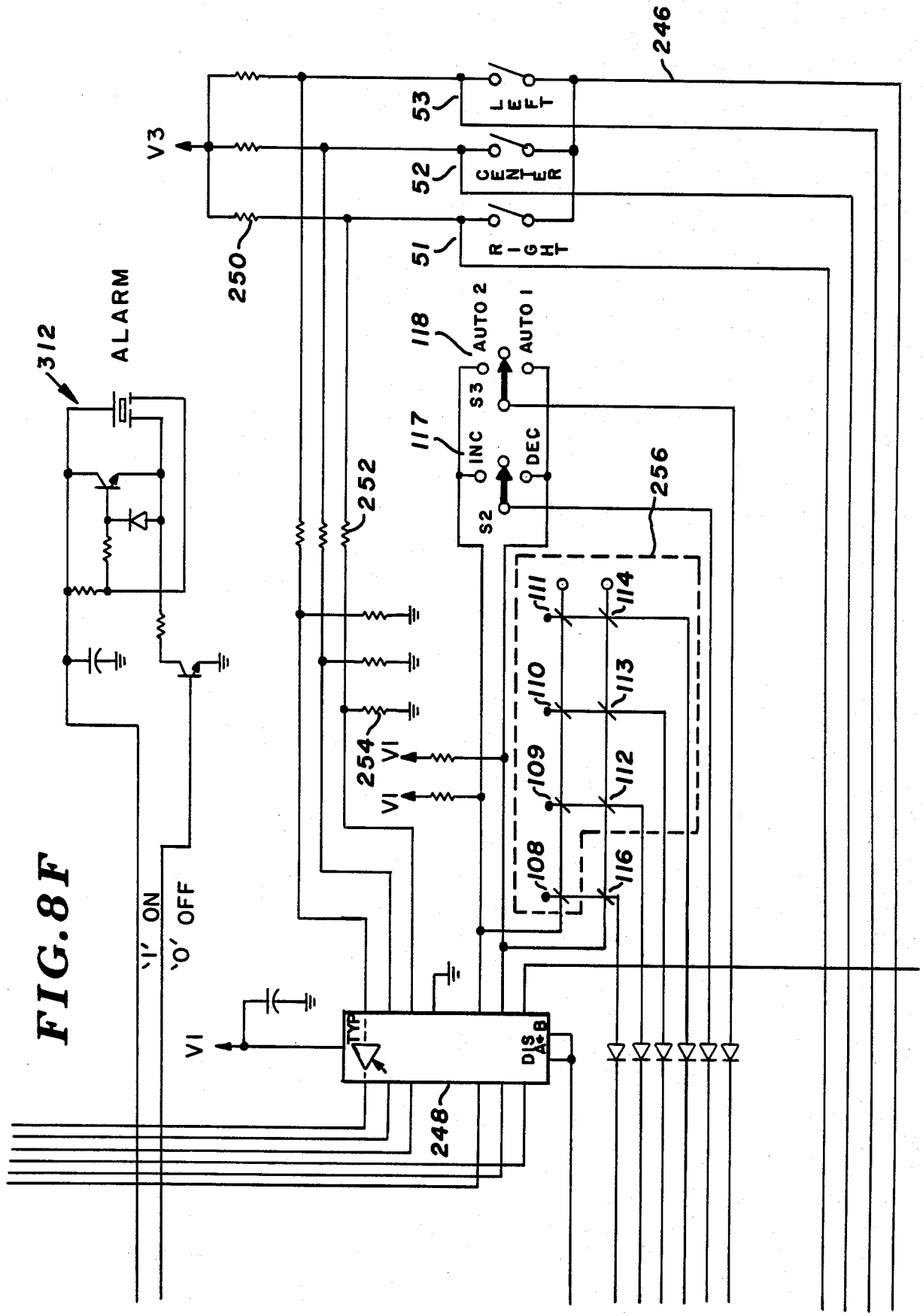

CONTROL METHOD AND APPARATUS FOR LIQUID DISTRIBUTOR

FIELD OF INVENTION

The technical field of this disclosure is an electromechanical automatic control system for controlling the dispensing of liquid from a liquid distributor. The control system is used with a liquid spraying distributor to control the discharge of liquid from a plurality of spray nozzles.

BACKGROUND OF INVENTION

The spreading of liquid fertilizers, herbicides, and insecticides is accomplished with a spraying apparatus having a spray boom equipped with a plurality of spray nozzles. The liquid is pumped to the spray boom whereby the liquid is discharged under pressure through the nozzles. Controls, including vehicle speed sensors, flow meters for sensing the flow of liquid from the pump to the spray boom, and the flow control valves are used to vary the rate of the flow of the liquid through the nozzles in relation to the vehicle speed. These controls try to achieve a preset liquid spray spread density over a wide range of vehicle speeds.

A vehicle mounted liquid distributor disclosed by Herman in U.S. Pat. No. 3,782,634 has a spray bar system that utilizes several booms having sets of spray nozzles arranged to spread liquid uniformly over the same width. A pump draws liquid from a tank and discharges liquid through a flow meter and flow control valves to the separate spray booms. Each spray boom has a plurality of nozzles. Separate liquid flow control valves regulate liquid flow to booms. A control system responsive to vehicle speed and liquid flow rate is operable to regulate the flow control valves, thereby regulating the amount of liquid discharged by the nozzles. The control system does not include means to monitor the performance of the nozzles, nor means to change the liquid dispensing rate after initial setup of the control system.

The Herman liquid distributor apparatus has a limitation of reverse control. When one or more nozzles are plugged with foreign material, the flow control system is not aware of this condition. It can only sense the total flow to all of the nozzles with the use of its flow meter.

In normal operation of prior liquid distributors or sprayers, the nozzles have substantially the same sized orifices and dispense substantially the same amount of liquid onto the ground. These distributors measure the flow of the liquid with a single flow meter that measures the total flow in the system to all of the nozzles. The controllers for these systems do not know how the liquid flow is distributed or spread across the ground. The controllers simply divide the total liquid flow by the ground area covered to compute gallons per acre. If the measured gallons per acre is less than the desired gallons per acre, a servo-valve opens to increase the liquid pressure in the spray booms. This will increase the liquid flow. When one of the nozzles plugs, the flow in the system will decrease. The result is that the flow meter will slow down. The controller for the system will operate to increase the pressure to get the total flow of liquid back to its selected rate. The result is that the plugged nozzle is inoperable and the remaining nozzles are dispensing excess liquid. There is no warning to the operator of the plugged nozzle. The operator must visually observe the operation of all of the nozzles to insure their operation. In many distributors, all of the nozzles are not visible by the operator so liquid would not be dispensed over many acres without knowledge of an inoperative nozzle. The reverse control apparatus reacts to cover up the plugged malfunctioning nozzle.

Oligschlaeger discloses, in U.S. Pat. No. 3,877,645, a vehicle mounted liquid distributing apparatus having a pump for delivering liquid under pressure to a spray bar system. The flow of the liquid to the spray bar system is controlled in accordance with the ground speed of the vehicle to maintain a generally uniform preset spray spread density. The control includes a device for sensing the pressure of the liquid in the spray bar, a vehicle speed sensor, and an electrical circuit means responsive to the signals from the device for sensing pressure and vehicle speed sensor to control the rate of flow of liquid to the spray bar as a function of the square of the speed of the vehicle.

The flow control valves of the prior art liquid sprayers are known as servo-valves. These valves have valving members that operate over a fixed path of movement. In butterfly top valves, the path of movement operates over the same 90 degrees of rotation of the valve. Electromechanical end stops are required for these valves. One end stop determines the full open position of the valve and the other end stop the fully closed position of the valve. Over a period of use, the motion transmitting structure, including gears, will wear causing malfunctioning of the valve.

The application rate of the liquid sprayed cannot be readily varied in operation. The operator must stop the spraying operation and set a new rate in the controls for the liquid dispensing apparatus. This is inconvenient and requires considerable time.

SUMMARY OF INVENTION

The invention is directed to a method and apparatus for dispensing liquids, such as agricultural chemicals, onto a desired location in a manner to maintain substantially a uniform liquid dispensing density independent of the ground speed of the apparatus. The apparatus includes a tank for storing the liquid to be dispensed onto the location and means for supporting the tank for movement relative to the ground. The ground speed of the apparatus is sensed with a ground speed sensor operable to provide a first signal related to the ground speed. A pump means is operable to draw the liquid from the tank and discharge the liquid to a boom means. The boom means has a plurality of nozzles for dispensing the liquid to the desired location. A liquid flow meter is used to monitor the flow rate of liquid to the boom means. The flow meter generates an electrical signal related to the gallons of liquid that flow through the meter. A valve means is used to control the flow rate of the liquid to the boom means. A power means operatively connected to the valve means is controlled with a controller in a manner to regulate the operation of the valve means and thereby control the flow rate of liquid to the boom means according to signals from the controller so that a desired amount of liquid is dispensed from the nozzles to maintain substantially uniform liquid spray density independent of the ground speed of the apparatus.

A feature of the invention is the use of boom means having a plurality of boom sections. Each boom section has a plurality of nozzles for dispensing liquid onto the location. A plurality of solenoid operated valve means are connected to the fluid line means leading to each boom section operable to cut off the flow of liquid to the boom section. The controller has a plurality of switch means selectively operable to energize a solenoid operated valve so that the operator can shut off the flow of liquid to one or more boom sections, as desired. The controller includes means to maintain the liquid flow rate to the boom sections that have not been cut off from the liquid substantially constant, whereby the density of the liquid discharged from the boom sections that have not been cut off is not increased. The means to maintain the liquid flow rate to the boom sections includes means to sense the pressure of the liquid downstream from the flow control valve. This means generates a signal that is related to the pressure of the liquid. The signal is accommodated by the controller, which functions to control the operation of the flow control valve to attain the desired liquid flow rate to compensate for the shut-off boom sections.

Another feature of the distributor of the invention is a flow controller having a dual rate control allowing the operator to change the dispensing rate without shutting down or reprogramming the controller. The controller has means to control the flow rate of liquid to the boom means at a selected flow rate. This means includes a first selector means having a first position to control the flow rate of liquid to the boom means at a selected first flow rate and a second position for controlling the flow rate of the liquid to the boom means at a selected second flow rate, the second flow rate being greater than the first flow rate. The first selector means has a third position operable to hold the flow rate of liquid to the boom means at its desired rate independent of the ground speed of the apparatus. Means are operable to selectively increase and decrease the flow rate of the liquid when the first selector means is in the third position. The means operable to selectively increase and decrease the flow rate is a manually operated second selector means having a first position to increase the flow rate of liquid to the boom means and a second position to decrease the flow rate of liquid to the boom means. In use, the operator uses the high flow rate in situations where it is needed, such as in weedy conditions. The result is that there is a substantial saving and a minimum of over-application of the liquid.

Another feature of the controller of the invention is the means for determining the gallons per acre percentage error and displaying the error information on a visually observable display in terms of percentage of error. The gallons per acre of liquid dispensed varies due to ground speed variations of the dispenser and response time of the controller to compensate for speed variations. A negative digital read-out will be displayed when the actual gallons per acre is less than the set gallons per acre and positive if the actual gallons per acre is more than the preset gallons per acre. The use of a percentage read-out makes the function consistent at all gallon per acre rates.

Another feature of the controller of the invention is the incorporation of means for automatically making a nozzle size adjustment. The amount of the adjustment depends upon the sprayer, the flow rate, the gallons per acre, and the speed that is used. The purpose of the adjustment is to compensate for the extra pressure drops found between the pressure sensor and the nozzles. The controller, in response to the operation of the nozzle monitor function key, will automatically measure the effective nozzle size and load this nozzle size information into the program of the controller.

Another feature of the invention is the use of flow control valve means operated with an electric motor to control the liquid flow rate to one or more spray bars in cooperation with a controller that can vary the operating speed of the valve means. The controller with its programmable valve response enables the operator to optimize the control functions of the controller to a particular liquid distributor or sprayer. The controller allows the flow control apparatus to be effectively used with different types and sizes of sprayers, including a one-bar sprayer.

Another feature of the invention is the utilization of a servo-motor control for a flow control valve that periodically changes the operational movements of the valving member to avoid concentrated and uneven wear of valve and motor parts. The motor control has one end stop switch and does not operate the motor and valving member over a totally fixed path. The controller can be actuated to change the operating path of the motor and valving member so that wear on the mechanical parts of the motor and valve is not concentrated to any particular portion of the motor or valving member. This increases the operational life of the motor, flow control valve, and power transmitting means connecting the motor to the valve.

These and other advantages and features, which characterize the invention are pointed out with particularity in the Drawings, Specification, and Claims.

IN THE DRAWINGS

FIG. 5 is an enlarged sectional view taken along the line 5—5 of FIG. 4;

FIG. 6 is a sectional view taken along the line 6—6 of FIG. 4;

FIG. 7 is an elevational view, partly sectioned, of the pressure sensor and connection thereof to the liquid carrying line.

DESCRIPTION OF PREFERRED EMBODIMENT

Figure 1:
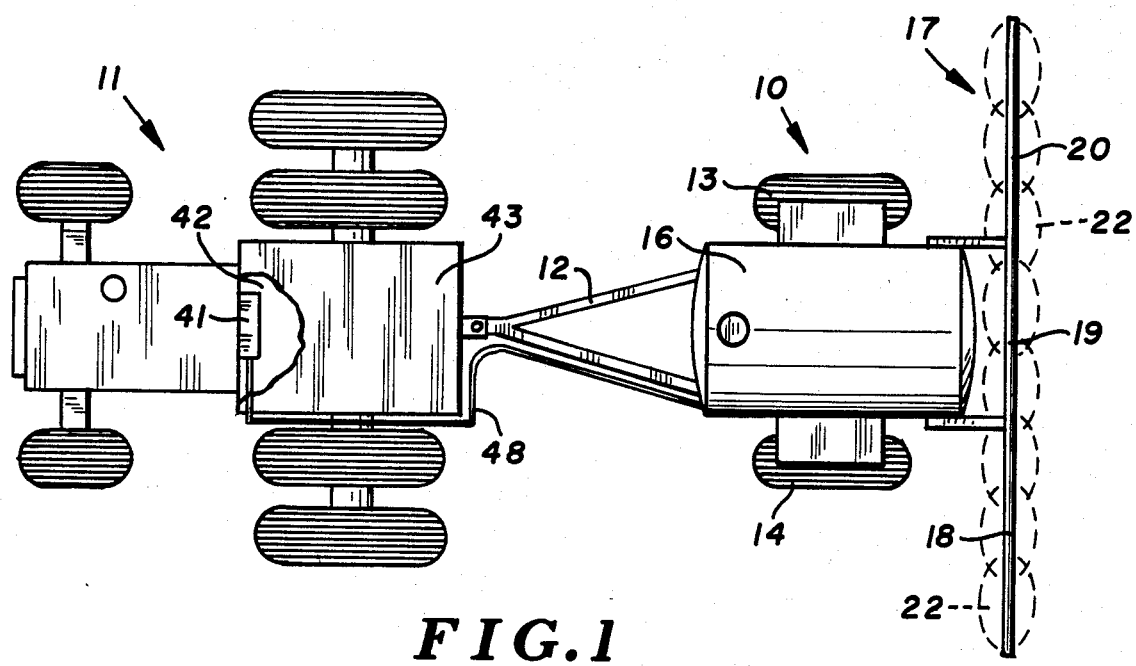
FIG. 1 is a plan view of a liquid distributor equipped with the control apparatus of the invention.

Referring to the drawing, there is shown in FIG. 1 a liquid distributor indicated generally at 10 for dispensing liquid, chemicals, and wettable powders, such as herbicides, insecticides, and fertilizer, on the soil and plants growing in the soil. Distributor 10 is a liquid spraying implement connected to a towing vehicle, indicated generally at 11, such as an agricultural tractor. Distributor 10 has a frame 12 movably supported on the ground with a pair of wheels 13 and 14. A large tank 16 accommodating the liquid to be dispensed is mounted on frame 12.

Figure 2:
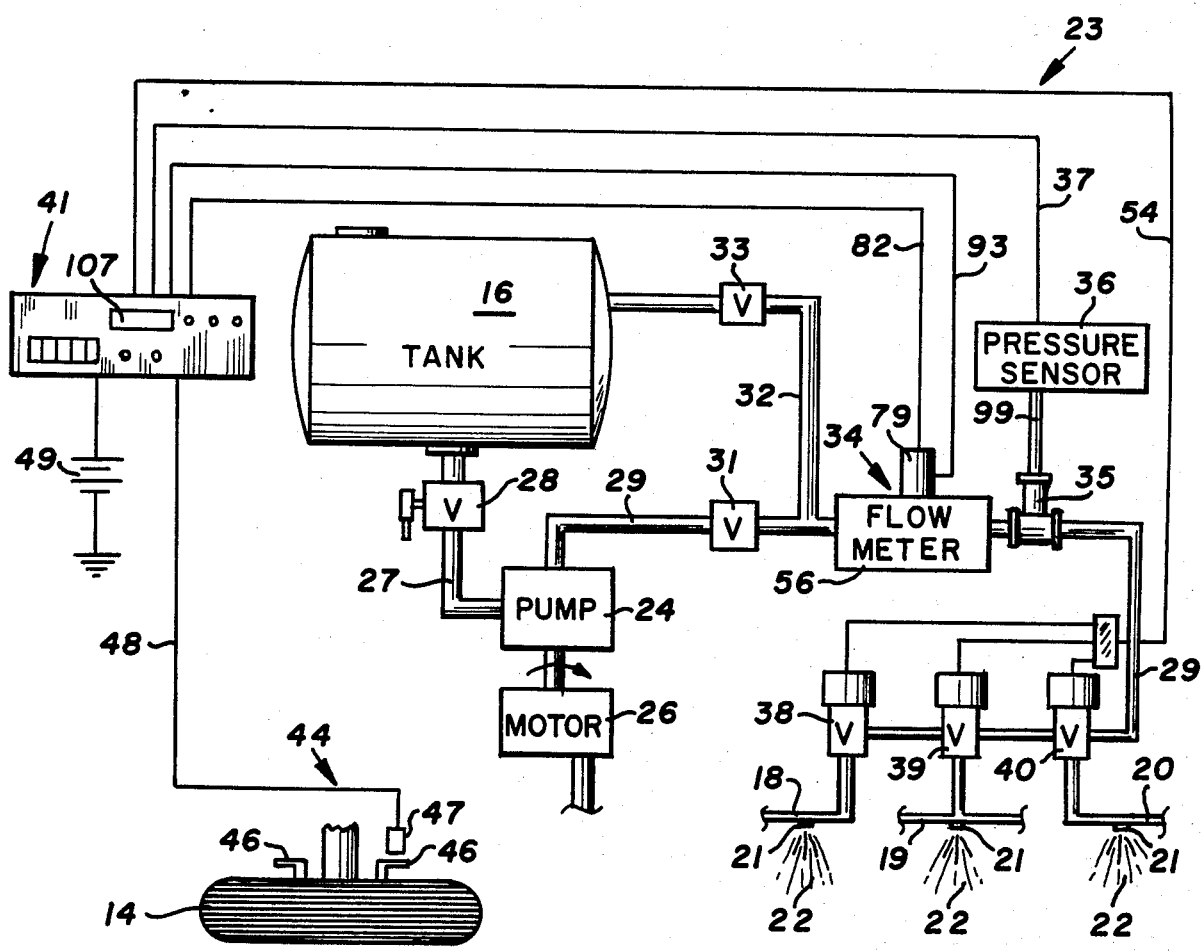
FIG. 2 is a diagrammatic view of the control apparatus for the liquid distributor.

An elongated transverse spray boom 17 is attached to frame 12 behind tank 16. Boom 17 is divided into three sections, identified as a left section 18, middle section 19, and right section 20. The sections 18 and 20 are articuately mounted at the inner ends thereof with respect to middle section 19 to permit sections 18 and 20 to move to an upright transport position. As shown in FIG. 2, each section 18, 19, and 20 has a plurality of downwardly directed nozzles 21 for dispensing liquid 22 onto the ground. Nozzles 21 are longitudinally spaced along the length of each boom section 18, 19, and 20. This space between adjacent nozzles can vary between 5 to 10 cm. Each nozzle has a spray tip containing one or more openings through which liquid is discharged toward the ground. The spray can be a broadcast or band pattern. The tank 16 and spray boom 17 can be mounted on the box of a pickup truck in lieu of frame 12 and tractor 11. The liquid dispensing control apparatus 23 of the invention is used with distributor 10 as hereinafter described. Control apparatus 23 can be used with implements for injecting chemicals, such as $NH_3$, into the ground. An implement for injecting $NH_3$ into the ground with a plurality of nozzles is disclosed in U.S. application Ser. No. 355,138, filed Mar. 5, 1982. This implement can be equipped with the control apparatus 23 of this invention. U.S. application Ser. No. 355,138 is incorporated herein by reference.

Referring to FIG. 2, there is shown the control apparatus indicated generally at 23 for controlling the rate of application or density of liquid onto the ground and plants thereon according to a predetermined rate. Apparatus 23 includes a pump 24 driven by a motor 26, such as a hydraulic motor. Pump 24 can be driven directly by the power takeoff of tractor 11, an electric motor, hydraulic motor, or an internal combustion engine. The hydraulic fluid for operating motor 26 is derived from tractor 11 and controlled with a suitable control valve (not shown). An inlet line or pipe 27 connects pump 24 to the bottom of tank 16. A tank on-off valve 28 is interposed in line 27. Valve 28 is manually movable to a closed position to shut off the flow of liquid from tank 16 to pump 24. When valve 28 is open, the liquid in tank 16 flows to the pump inlet. An outlet pipe or line 29 carries the liquid under pressure from pump 24 through a manually operated on-off valve 31. A bypass line 32 joined to outlet line 29 carries the liquid back into tank 16. A manually operated valve 33 is interposed in bypass line 32 to control the flow of liquid therein. Valve 31 is located downstream of pump 24 and before bypass line 32. Valve 31 is used to make overall spray pressure adjustments. A solenoid-operated servo-valve may be used in lieu of control valve 33. When valve 33 is open, the pump 24 delivers liquid under pressure to bypass line 32, which discharges the liquid back into tank 16, thereby agitating and mixing chemicals with the liquid, such as water, in tank 16.

A valve and flow meter assembly indicated generally at 34 is located in outlet line 29 downstream from bypass line 32. Assembly 34 functions to provide a signal related to the rate of flow of liquid in line 29 and restrict the rate of flow of liquid in line 29. The flow meter is a positive displacement meter that generates a fixed number of electrical pulses for every gallon of liquid that flows through the meter. The flow control valve and flow meter can be separate units. A coupling 35 in line 29 is connected with a tube 99 to a liquid pressure sensor 36 operable to provide a pressure signal indicative of the pressure of the liquid in line 29 downstream of valve and flow meter assembly 34. Pressure sensor 36 is a pressure transducer which generates a fixed increase in frequency per psi of input pressure. Line 29 extends from coupling 36 to a plurality of solenoid-operated shut-off valves 38, 39, and 40 operable to control the flow of liquid to the left, middle, and right boom sections 18, 19, and 20, respectively, of spray boom 17. Valves 38, 39, and 40 are mounted in series to provide liquid shut off of selected boom sections. One or more of boom sections 18, 19, and 20 can be shut off by the operator from cab 43.

A control console or controller indicated generally at 41, located in the operator compartment 42 of cab 43 of tractor 11, is operable to control the spraying of the liquid from spray boom sections 18, 19, and 20 and provide the operator with read-out digital information of the spraying operation, such as gallons per minute, gallons per acre, total acres sprayed, total gallons sprayed, and pressure of liquid. Controller 41 also has controls, whereby the operator can set a predetermined gallons per acre and check the error percent between the present gallons per acre and the actual gallons per acre dispensed onto the ground. The operator with the use of controller 41 can also increase or decrease the amount or density of liquid pensed from boom 17.

The ground speed of the distributor 10 is sensed with a ground speed sensor indicated generally at 44. As shown in FIG. 2, sensor 44 comprises a ring having a plurality of fingers 46 secured to the inside of wheel 14. A sensing device 47 located adjacent the inner portions of fingers 46 provides pulsed electrical signals in response to the number of fingers that move by sensing device 47. The signals are transmitted via electrical conductor line 48 to controller 41. The ground speed sensor 44 is a switch means operable to provide a pulsating electrical signal directly related to the ground speed of apparatus 10. The sensor 44 may be a Hall effect digital switch triggered by one or more metal elements, including magnets, on fingers 46. An example of a Hall effect digital switch is disclosed by McEdwards in U.S. Pat. No. 4,325,199. Other types of ground speed sensors having an output signal proportional to the ground speed of the apparatus can be used to provide ground speed information to controller 41.

Figure 3:
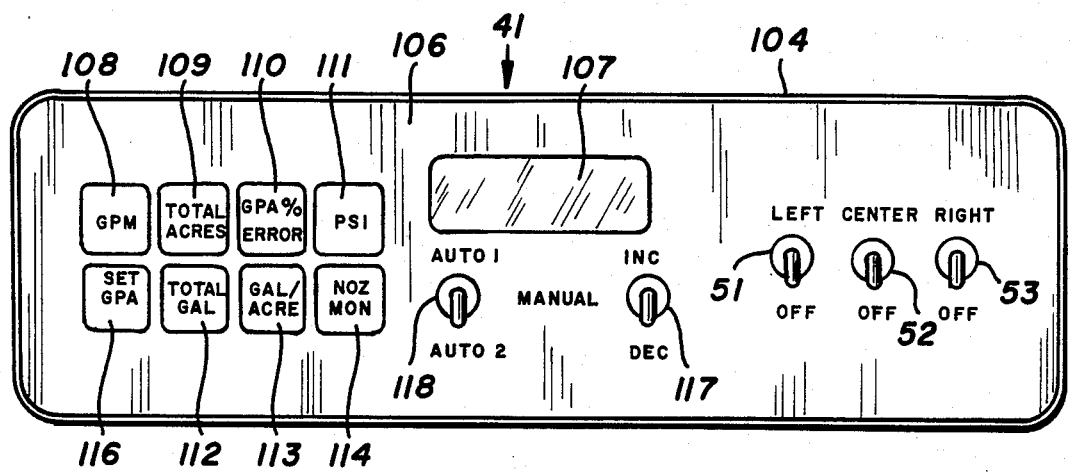
FIG. 3 is a front elevational view of the controller of the control apparatus.

Controller 41 is connected to an electric power source 49, such as a battery. As shown in FIG. 3, controller 41 has three on-off toggle switches 51, 52, and 53 electrically coupled to solenoid valves 38, 39, and 40 with a conductor cable 54. Switches 51, 52, and 53 are selectively operated to actuate solenoids 38, 39, and 40 to open the valves and thereby allow liquid under pressure delivered by pump 24 to be dispensed via nozzles 21 onto the ground and plants thereon. The operator of the vehicle can selectively energize the solenoids 38, 39, and 40 as desired by operating switches 51, 52, and 53 to control the spraying of the liquid from the left, middle, and right sections 18, 19, and 20 of spray boom 17. When one or more of the solenoids are de-energized, the valve associated therewith will close, cutting the flow of liquid to the boom section connected to the valve. Controller 41 operates to maintain the selected spray density of the liquid when one or more of the boom sections are cut off.

Figure 4:
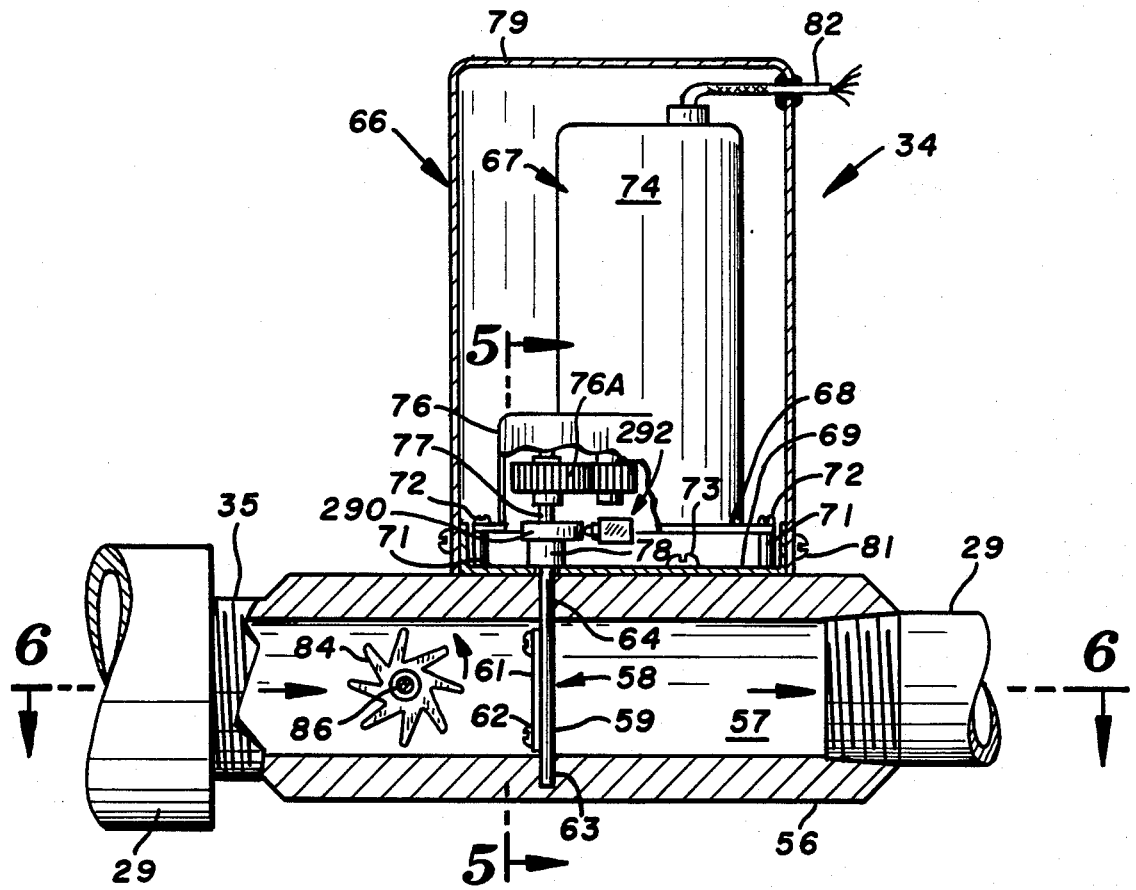
FIG. 4 is an elevational view, partly sectioned, of the servo-valve and flow meter assembly.

Referring to FIGS. 4, 5, and 6, valve and flow meter assembly 34 has an elongated housing or body 56 provided with a linear passage 57 for accommodating liquid from pump 24. Opposite ends of body 56 are connected to line 29. A butterfly valve 58 located in passage 57 is operable to control the rate of flow of liquid through passage 57. Butterfly valve 58 has a vertical shaft 59 supporting a generally circular disc 61. A plurality of fasteners, such as screws 62, secure disc 61 to shaft 59. As shown in FIG. 5, disc 61 has a continuous outer peripheral edge 62 located in close relationship to the inside wall of passage 57 to restrict the flow of liquid through passage 57 when disc 61 is in the closed position. As shown in FIG. 6, disc 61 can be rotated to an open position, as shown in dotted lines, to increase the rate of flow of liquid through passage 52. Disc 61 can be rotated to its full open position about 90 degrees from the closed position to allow maximum liquid flow through passage 57. The lower end of shaft 59 projects into a recess 63 in body 56. The upper end of shaft 59 extends through a hole 64 in body 56. A power control, indicated generally at 66, is operatively coupled to shaft 59 to rotate shaft 59 and thereby adjust the position of disc 61 between its open and closed positions to control the rate of flow of liquid through passage 57. Power control 66 is operated in response to signals from controller 41. Butterfly valve 58 operates in any one of four 90-degree quadrants. A cam 290 operating a position switch 292 provides an output voltage indicating the quadrant in which the disc 61 is operating. This information enables controller 41 to determine the required motor drive polarity. When the total acres function key 109 is cleared to 0, valve 58 is moved to a new quadrant by the software incorporated in controller 41. The gear drive mechanism 76A of power control 66 has extended useful life because it is not subject to continuous and concentrated use on only one 90-degree segment of each gear.

Returning to FIG. 4, power control 66 includes a gear head motor 67 mounted on a platform 68. Platform 68 is positioned above a base 69 with a plurality of upright posts 71. Bolts 73 threaded onto post 71 secure platform 68 to base 69. A plurality of bolts 73 secure base 69 to body 56. Gear head motor 67 has a reversible electric motor 74 drivably connected to a gear box 76. Gear box 76 has a gear train 76A connected to an output drive shaft 77 axially aligned with valve shaft 59. Cam 290 is mounted on shaft 77. A drive connection or collar 78 drivably connects shaft 77 to the upper end of valve shaft 64 whereby, on operation of electric motor 74, gear box 76 functions to rotate valve shaft 64, thereby adjusting the angular position of disc 61 in passage 57. The control program incorporated in controller 41 functions to control the operation of motor 74 to achieve the preset spraying conditions. Gear head motor 74 is enclosed within a box-shaped cover 79. A plurality of screws 81 secure cover 79 to base 69. An electrical conductor line 82 connects the electric motor 74 to controller 41.

As shown in FIGS. 4 and 6, a liquid flow sensor indicated generally at 83 is located upstream of butterfly valve 58. Flow sensor 83 has a generally flat impeller 84 having outwardly directed curved fingers supporting one or more magnets. Impeller 84 is rotatably mounted on a transverse shaft 86 with bearings 87. As shown in FIG. 6, impeller 84 is located along the longitudinal center line of passage 57. Shaft 86 has an end located in a recess 88 and an end extended through a hole 89 in body 56. A sensor unit 91 is mounted on a lateral boss 92 integral with body 56. Sensor unit 91 is operable to sense the speed of rotation of impeller 84 and produce an electrical output signal proportional to the speed of rotation of impeller 84. This output signal is conducted via line 93 to controller 41. Sensor unit 91 has a coil that produces an electrical current in response to rotation of the impeller 84. This current is proportional to the rate of flow of liquid in passage 57. Sensor unit 91 can be a Hall effect switch, hereinbefore disclosed with respect to switch 47. Alternatively, sensor unit 91 can have a reed switch operable with magnets in impeller 84 to control the flow of electrical current in a manner to indicate the rate of flow of liquid in passage 57. Other flow sensing means, as an optical coupler and a variable reluctance, can be used as a sensor to provide an electrical signal proportional to the rate of flow of liquid in passage 57. The functioning of controller 41 and its effect on power control 66 to control the position of butterfly valve 58 is hereinafter described.

Referring to FIG. 7, pressure sensor 36 is remotely located from T-connector 35. A nipple 94 having a passage 96 is threaded into the T-connector 35, whereby the liquid under pressure in connector 35 flows into passage 96. The upper end of passage 96 is partially closed with a washer 97 having a central hole 98. Hole 98 is substantially smaller than passage 96. A tube 99 engages washer 97 and extends to a connector 101 secured to the pressure sensor 36. A cap 103 threaded on nipple 94 holds an O-ring seal 103 in sealing engagement with tube 99. The small hole 98 in washer 97 allows liquid under pressure to flow through tube 99 to actuate pressure sensor 36. Hole 98, being relatively small, minimizes the pressure surges and sharp drops in line 29, so as to prevent erratic operation of pressure sensor 36.

Returning to FIG. 3, controller 41 has a housing 104 enclosing a micro-processor having the control software and supporting a display board 106. A digital display 107 is located in the center of board 106. The board 106 has seven function switches or keys 108 GPM, 109 Total Acres, 110 GPA (Gallons Per Acre) Percentage Error, 111 PSI, 112 Total Gal., 113 Gal. Per Acre, and 114 Noz. Mon. (Nozzle Monitor). Located adjacent the seven function keys is a set GPA (Gallons Per Acre) key 116 operable to allow the operator to program in a target gallon per acre setting.

A switch 117 has an up increase position and a down decrease position useable to increase or decrease the pressure of the liquid when the controller 41 is in manual mode. Switch 117 is also used to increase or decrease the desired gallons per acre when controller 41 is in an automatic mode and to change any of the calibrated numbers when in the calibration mode. A three-position switch 118 operates in the manual, auto 1, and auto 2 modes. A change in the liquid application rate or density is achieved by moving the switch from low or auto 1 mode to high or auto 2 mode. This will increase the liquid application rate where it is needed, such as in high weed areas. As soon as these areas are sprayed, the switch is returned to auto mode 1. This results in a saving of significant amounts of chemicals. When switch 118 is in either the auto 1 or the auto 2 mode, it will cause servo-valve 58 to automatically adjust the spray pressure and maintain a constant gallons per acre even with the varying ground speed or different spray boom sections 18, 19, and 20 switched on or off.

Now referring to FIGS. 8A through 8I, when arranged, as indicated in FIG. 8, they provide a schematic block diagram of the micro-processor base control logic used to effect the overall control of the liquid control apparatus 23.

The drawings comprising FIGS. 8A through 8I, when arranged as shown in FIG. 8 of the drawings, depict an electrical schematic diagram of the micro-processor based controller employed in the preferred embodiment. The micro-processor itself is indicated generally by numeral 150 and, with no limitation intended, may comprise an INTEL 3039 micro-processor. It is an 8-bit parallel computer fabricated in a single silicon chip and having a 128×8 RAM data memory, 27 I/O lines partitioned into two 8-bit quasi-bidirectional ports and one truly bidirectional port which can be written into or read from. The Type-8039 microprocessor also includes an interrupt source and is capable of being used with external read only memories (ROM) and random access memories (RAM).

The foregoing general remarks will serve to characterize the type of micro-processor which is well suited for use in the controller of the present invention. The actual operating features of that device will become more apparent as the description of the overall control system continues.

As mentioned, the micro-processor 150 has associated with it a bidirectional, 8-bit port to which a data bus 152 is connected. Coupled to the data bus is a tri-state octal latch 154. When a high logic level is applied to the Latch Enable terminal LE the Q outputs thereof will follow the D inputs. When the $\overline{LE}$ goes low, the data at the D-inputs will be retained at the outputs until such time as the $\overline{LE}$ signal returns high again. Thus, the tri-state latch 154 can capture an 8-bit byte from the data bus 152 and retain that word all under control of the address latch enable signal (ALE) of the microprocessor 150. Also coupled to the data bus 152 are RAM chips 156 and 158. For the instant controller, each of these chips may comprise 4,096 8-bit words and, as such, function both as a storage means for program words (instructions) and data words. The address inputs are labeled $A_0$ through $A_{11}$ and are coupled to an address bus 160. The outputs from the micro-processor 150, labeled P20 through P23, comprise the four higher order program counter bits when an external programmed memory fetch is in progress. The lower order address inputs $A_0$ through $A_7$ of the RAM's 156 and 158 come from the outputs of the tri-state octal latch 154. In that the inputs to that latch are coupled to the data bus output $DB_0$ through $DB_7$ of the micro-processor, the contents of the program counter within the microprocessor 150 can be used, via the latch 154, to access instructions from the external memory devices 156 and 158. The so-acquired instruction may then be read back into the micro-processor via the data bus 152 to which the outputs of the RAM's 156 and 158 are tid.

The outputs labeled P11 through P17 comprise a quasi-bidirectional port of micro-processor 150. The line coupled to output P15 connects through a resistor 162 to the data input terminal, D of a dual 64-bit shift register chip 164. Output terminal P14 of the microprocessor is coupled through a resistor 166 to the clock inputs (CK) of the two shift registers contained on chip 164. The output from the highest order stage $Q_{64}$ of the shift register is coupled to the data input, D, of a further such dual 64-bit shift register 168 which is also clocked by the same signal emanating from output terminal P14 of the micro-processor. The output of the highest order stage of the shift register 168 is coupled via conductor 170 and diode 172 to an input terminal $P_{13}$ of the microprocessor. This is a memory save circuit, as disclosed in U.S. Pat. No. 4,247,913.

Also associated with the aforementioned shift registers is a binary counter 174 whose count input is coupled to output terminal P11. Its reset terminal is connected to output terminal $P_{12}$. The counter functions in a conventional fashion to count the clock pulses as they are received. The output from stage 8 of the counter 174 is connected to the base electrode of a PNP transistor 176 whose collector is tied to ground potential and whose emitter connects to the clock inputs of the shift registers 164 and 168. Shift registers 164 and 168 along with the binary counter 174 comprise a standby memory for storing the contents of the micro-processors instruction address counter in the event of a power failure interrupt. Then, when power is later restored, the micro-processor can fetch the information contained in the shift register auxiliary storage so that the micro-processor can resume its operation at that point in the program where it left off as a result of the power failure.

The clock circuit for the micro-processor is controlled by an external crystal oscillator indicated generally by numeral 178. This circuit includes a crystal having a natural frequency typically in the range of from 1 to 11 MHz with a 6 MHz crystal being preferred. The crystal itself is connected directly across the terminals X1 and X2 of the micro-processor. The circuit 178 comprises the master timing element of the system and all other time references are derived therefrom.

Figure 8A:
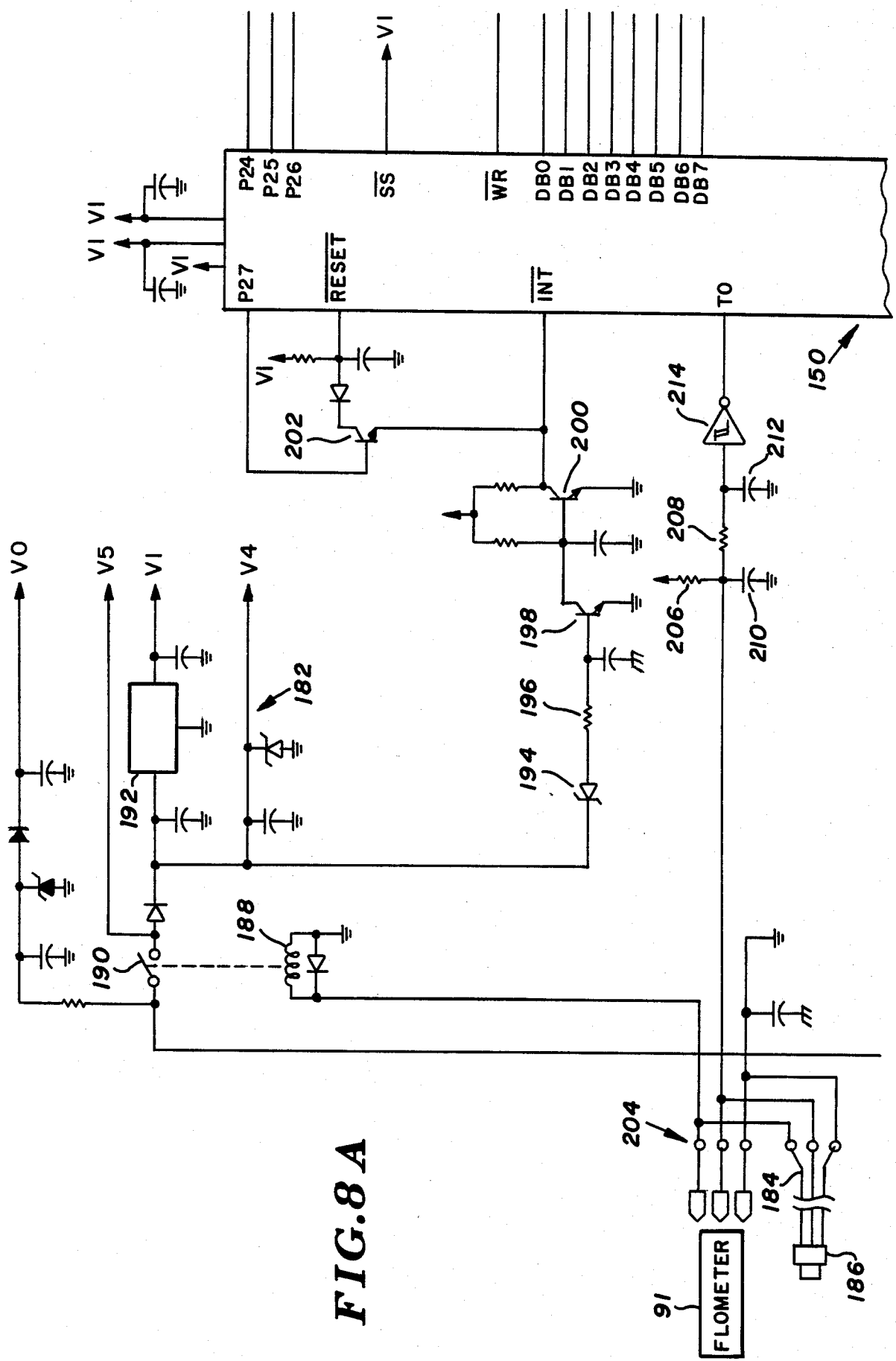
FIG. 8 is the arrangement of the drawings of FIGS. 8A-8I showing a schematic block diagram of the microprocessor base control logic to effect the control of the controller to effect control of the control apparatus.
Figure 8B:
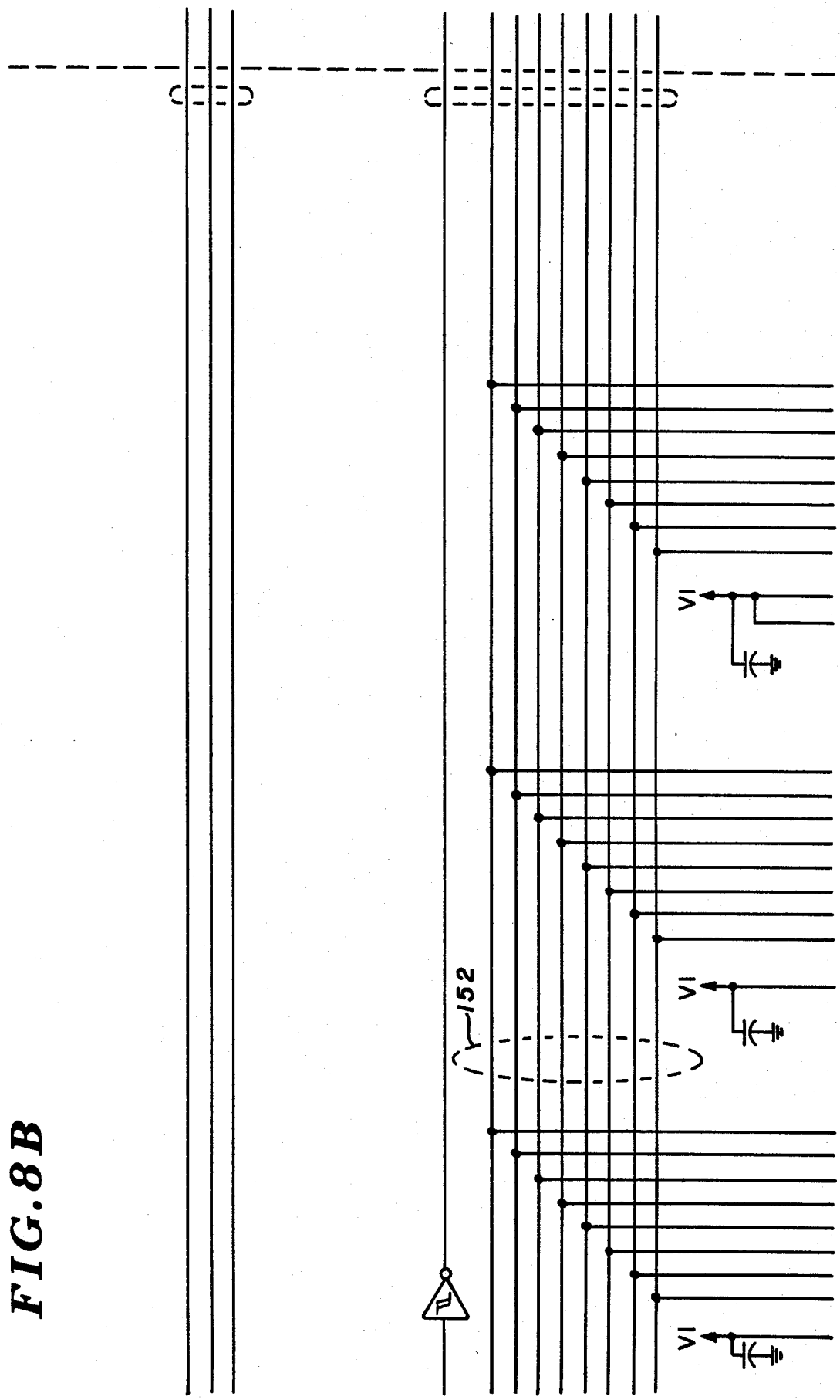
Figure 8C:
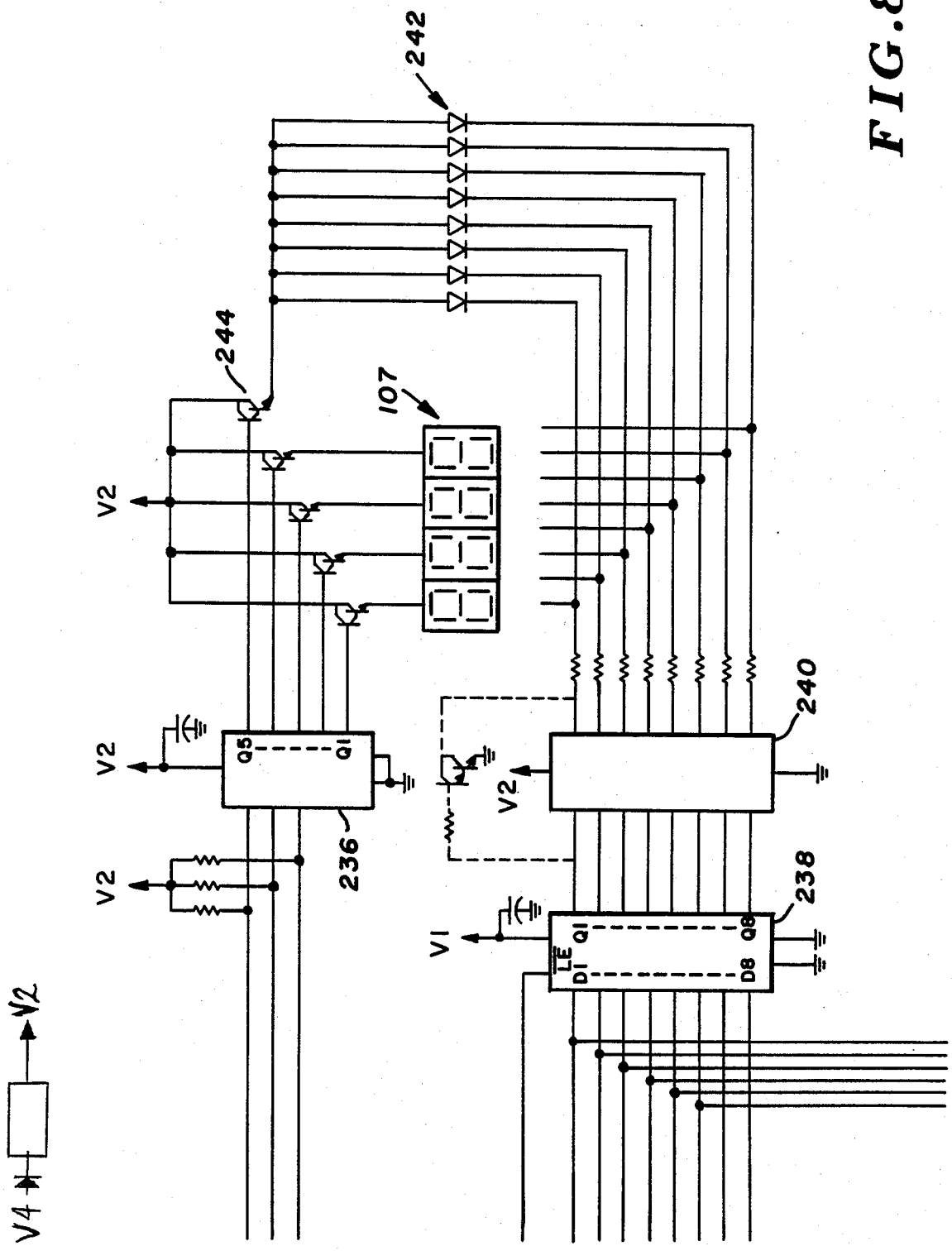
Figure 8D:
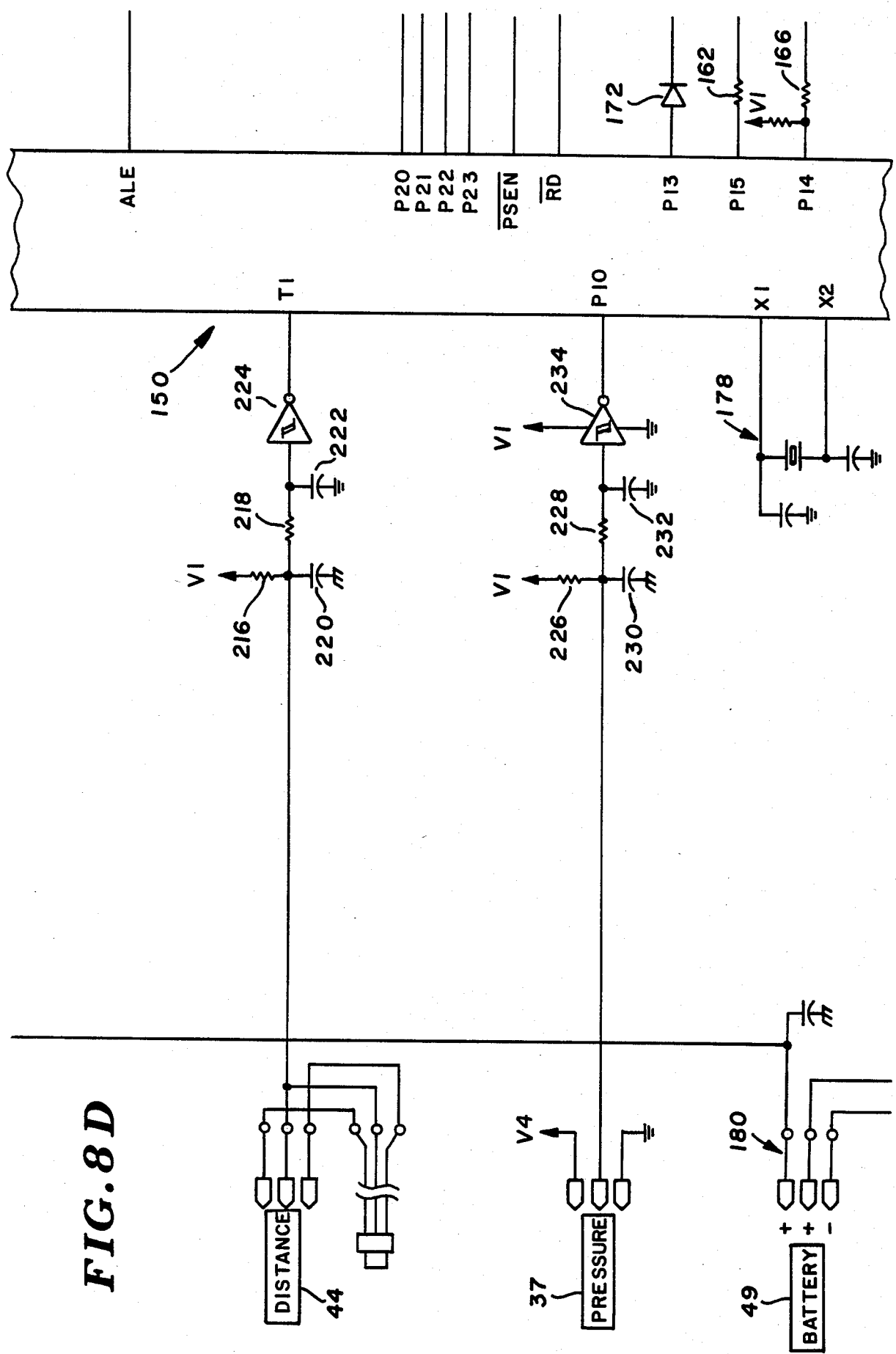
Figure 8G:
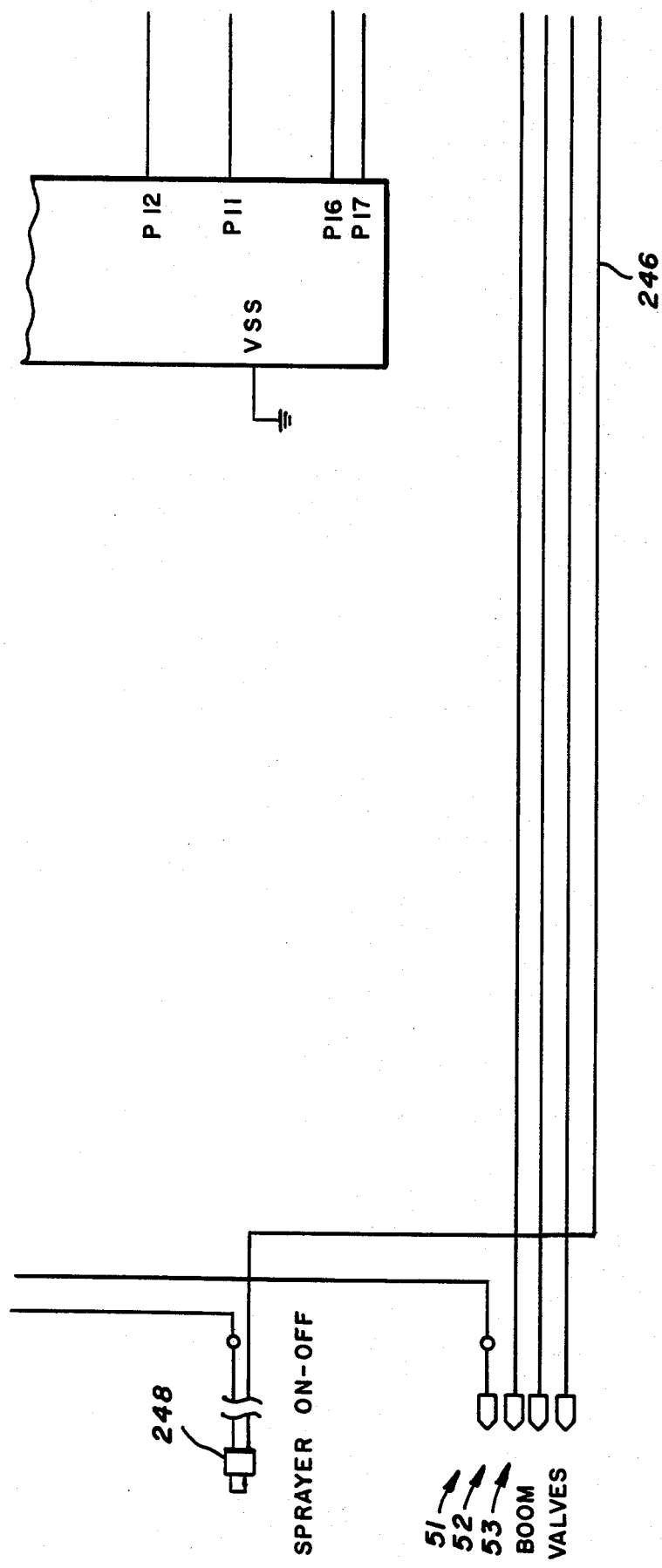
Figure 8H:
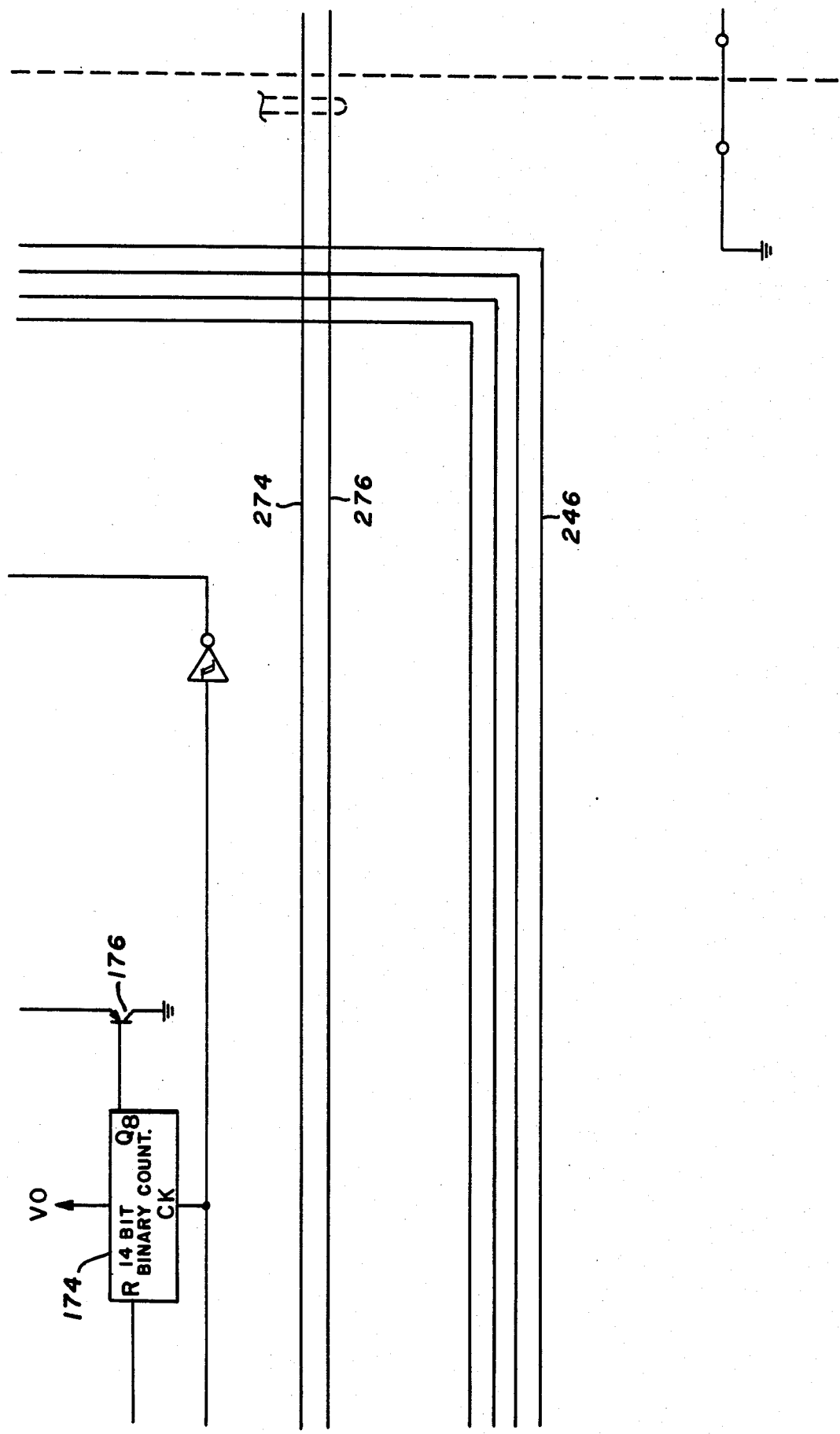
Figure 81:
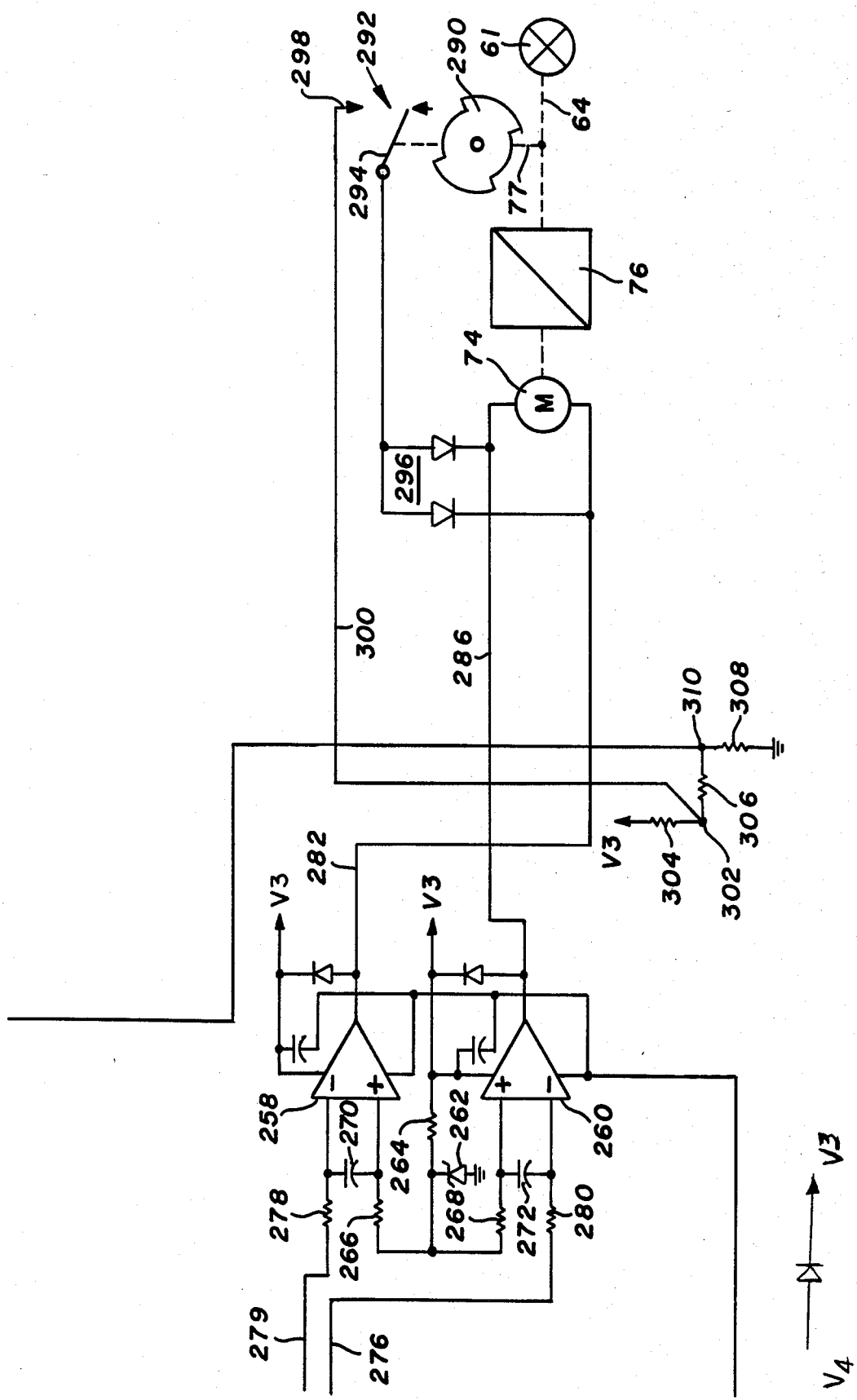

As is shown in FIG. 8D, the power for the electronics comprising the controller portion of the invention is derived from a battery 49 which is adapted to be connected via the battery cable 180 to the voltage regulator circuit shown in FIG. 8A and identified generally by numeral 182. Upon powering up the system, a voltage is applied over the lead 184 in the flow meter cable 186 to energize relay coil 188. This closes the contact 190 associated with that relay and applies battery potential to the input of the voltage regulator circuit 192. Zenor diode stabilized voltages, including the voltages $V_1$, $V_4$ and $V_5$ are applied at various points in the overall circuit comprising FIG. 8, as reflected by the corresponding V-numbers shown therein.

When the system is first energized, a positive going leading edge of a signal is applied via diode 194 and resistor 196 to the base electrode of a NPN transistor 198. This positive going signal renders that transistor conducting, which, in turn, causes a negative going signal to be applied to the base of NPN transistor 200. Transistor 200 is rendered non-conducting such that the output at its collector goes positive. This positive signal is applied to the $\overline{INT}$ of the micro-processor. The negative signal appearing at the collector of the transistor 200 results in the turning on of the transistor 202 and the application of a negative going impulse to the $\overline{RESET}$ terminal of the micro-processor. This serves to initialize the processor such that its internal counters are cleared and the address of the first instruction to be executed is entered into the CPU's program address counter. The circuit 194, 196, 198, 200 is a power fail detector circuit used to detect low voltage and generate an interrupt signal. In response to the interrupt signal, the computer stops all current processing and stores all critical data in the memory safe circuit 164, 168.

A cable 204 is used to connect the flow meter 91 to the micro-processor. Specifically, the cable is coupled through a wave shaping circuit including resistors 206 and 208 and the capacitors 210 and 212 along with a Schmitt trigger inverter circuit 214. The output from the Schmitt trigger inverter circuit is connected to the T0 input pin. When executing a jump instruction, the processor may sample the state of the signal applied at the T0 input which may result in a jump out of the normal program sequence, depending upon the binary state of the input at the time that the test is made.

The speed sensor 44 associated with the wheel of the distributor 10 is coupled through a similar wave shaping circuit which includes the resistors 216 and 218 along with the capacitors 220 and 222 and a further Schmitt trigger inverter circuit 224 to an input pin T1 of the micro-processor. Commonly, this input can be designated as the "timer/counter input" and by using a START COUNTER instruction, can be used to initiate timing sequences. By accumulating the number of regularly occuring clock pulses during an interval, the number of pulses per unit of time and therefore the speed of the vehicle or the distance covered can be inferred.

The pressure sensor 37 is also coupled to the microprocessor via a wave shaping circuit including resistors 226 and 228 along with capacitors 230 and 232 and a Schmitt trigger inverter circuit 234. The output of the Schmitt trigger inverter 234 is connected to an input pin P10. In that the frequency of the pulses emanating from the pressure sensor 37 is directly proportional to the pressure in the distribution lines, the digital equivalent of the pressure reading may be sampled and used during subsequent computations by the computer.

Now that the details of the micro-processor portion of the control system have been explained, consideration will be given to the makeup of the various manual control switches, indicators and display circuit utilized in the system. This circuitry is contained in FIGS. 8C, 8F and 8I.

The display 107 is preferably of the type in which light emitting diodes are arranged to form 7 segments whereby alpha-numeric characters can be generated by illuminating selective ones of those segments. Connected to terminals P24 through P26 (port 2) of the micro-processor is binary-coded decimal to decimal decoder circuit 236 whose outputs are coupled to semiconductor drivers associated with the individual display elements comprising the overall readout device 107. Hence, depending upon the binary code applied to the decoder 236, one of the displays of device 107 can be selected for the presentation of an alpha or numeric character.

Coupled to the data bus 152 is a tri-state octal latch 238. This device may be a type 74C 373 integrated circuit available from National Semiconductor Company. It comprises an 8-bit storage element having tri-state outputs. When an high signal is applied to the Latch Enable input ($\overline{LE}$), the outputs $Q_1$ through $Q_8$ will have the same signals as are existing on the input terminals $D_1$ through $D_8$. Now, when the $\overline{LE}$ goes low, the data at the D-inputs, which meets the set-up and hold time requirements of the circuit, will be retained at the outputs until such time as the $\overline{LE}$ returns to its high state. In summary, then, the circuit 238 functions to capture the data presented to it over the data bus 152 when appropriately controlled by the $\overline{LE}$ enable signal. That latter signal emanates from the $\overline{WR}$ terminal of the microprocessor, which is an output strobe occurring during a bus write operation.

The outputs $Q_1$ through $Q_8$ of the latch 238 are applied via a driver circuit 240 to the 7 segments comprising the elements of the LED display 107. Thus, depending upon the bit permutations of the number captured in the latch 238, different alpha-numeric characters will be formed by selective illumination of the various segments comprising the display 107.

As can be seen in FIG. 3, each of the push buttons 108 through 114 has a LED indicator in its upper right hand corner. Thus, when the Gallons Per Minute (GPM) switch 108 is activated, its associated LED will glow to indicate that the system is in the GPM mode. In FIG. 8C these eight LED elements are identified generally by numeral 242. To effect the illumination of any one of these LED's, stage $Q_5$ of the decoder 236 must be such that the semiconductor driver 244 is conducting. Also, an appropriate driver in circuit 240 must be applying the appropriate voltage to the selected LED.

The condition of the various input switches is also sampled by micro-processor 150 over the data bus 152. As shown in FIGS. 8C and 8F, the three solenoid valves 38, 39 and 40 have separate switches 51, 52, and 53 associated with them. When any one of these switches is closed, a signal is provided over the conductor 246 and via sprayer on-off cable 248 to a control having a power on and off switch.

Associated with the right, center and left valve switches 51, 52 and 53 is a voltage divider network which couples the voltage source $V_3$ to a tri-state buffer integrated circuit chip 248. For example, a resistor 250 is connected in series between the voltage source $V_3$ and one side of the right boom valve switch 51. Resistors 252 and 254 complete the voltage and apply either a high or a low logic signal to input pin 6 of the buffer circuit 248. In a similar fashion, voltage divider networks couple the switch 52 to pin 4 of the tri-state buffer and switch 53 to pin 2 thereof. The tri-state buffer circuit 248 is preferably a hex non-inverting buffer with three-state outputs, and a high current source and sink capability. The three-state outputs make it useful for use in connection with micro-processor systems, such as the present one, having a common busing arrangement. This chip has two Disable inputs. A binary high signal on the Disable A input causes the output of buffers 1–4 to assume a high impendence state and a high level on the Disable B input of that chip causes the outputs of buffers 5 and 6 to assume their high impendence state. In the present application, it is convenient to tie both of the Disable A and Disable B inputs together such that when a high signal appears at the read strobe output ($\overline{RD}$) the logic signals indicative of the condition of the various switches will be blocked from being applied to the data bus 152. When the $\overline{RD}$ signal is low, however, the logic state existing at the input of the hex tri-state existing at the input of the hex tri-state buffer will appear at its output and will be applied to the data bus such that they can be sampled by the micro-processor or used to control the display 107 via the latch 238 and driver 240.

Shown enclosed by the dashed line box 256 in FIG. 8F are the seven function keys which are used to select any one of 7 modes which can be displayed in the digital readout 107. These correspond to the key switches 108–114 of FIG. 3 and, as such, each is labeled accordingly as to its function in FIG. 8. Also included in the keyboard is the switch 116 which permits a target value of Gallons Per Acre to be entered into the computations Activation of one of the keys 108–114 or 116 or the Increase/Decrease switch 117 or the Auto 1/Auto 2 select switch 118 results in the transfer of a signal via the buffer chip 248 to the data bus 152. These keys are also coupled via lines in the address BUS 160 to the RAM's 156 and 158. Thus, depending upon which key or switch is activated, different binary address words are presented to the storage devices for reading information from those memory chips onto the data bus 152 where they become available to serve as operands in further computation and/or for presentation on the LED display device 107.

Referring next to FIG. 8I, there is the circuit used to drive the butterfly servo-valve shown in FIGS. 4, 5 and 6 of the drawings. The driving circuit therefore comprises a pair of operational amplifiers 258 and 260 which are connected in a conventional fashion to function as signal comparators. A source of reference potential $V_3$ which is stabilized by a Zenor diode 262 is coupled through resistors 264, 266 and 268 to the non-inverting input terminals of the operational amplifiers 258 and 260. Wave shaping capacitors 270 and 272 are connected directly across the inputs of the operational amplifiers and the inverting inputs thereof come from terminals P16 and P17 of the micro-processor via conductors 274 and 276 and the direct coupling resistors 278 and 280, respectively.

The output from the operational amplifier 258 connects via conductor 282 to one side of a DC motor 284. The output from the operational amplifier 260 is likewise connected by a conductor 286 to the other side or terminal of the DC motor 284. As previously mentioned, the shaft of the motor is coupled through a gear train represented schematically by block 288 and the output of the gear train drives the butterfly element 61. Coupled to the shaft which drives the butterfly element is a 4-quadrant cam 290 which is associated with a position switch 292. The switch arm 294 of the position switch 292 is connected through a diode OR circuit 296 to the opposed terminals of the motor 284. The normally open contact 298 of the position switch is connected by a conductor 300 to a tap 302 of a voltage divider which includes the resistors 304, 306 and 308 which are connected in series between a source of reference potential $V_3$ and ground. The tap 310 of the voltage divider is connected as an input to one of the tri-state buffers contained on the integrated circuit 248.

The two bits applied to the conductors 274 and 276 by the micro-processor can define four separate states or conditions. If the signal applied to the inverting input of one of the operational amplifiers is greater than the voltage signal applied to the non-inverting input, the output from that operational amplifier will be high. If, on the other hand, the reference voltage applied to the non-inverting input is greater than the input signal, the output of the operation amplifier will be low. With this fact in mind, then, it can be seen that at least one motor drive input will always be negative. The diodes 296 steer the negative signal to the position switch and, as such, the output voltage level of the position switch will be determined by the particular quadrant that the switch cam 290 (and therefore the butterfly disc 61) is in. The output voltage from the position switch controls the level of the signal appearing at the tap 310 of the voltage divider and, accordingly, signals the micro-processor, via the tri-state buffer network 248 and the data bus 152 to sense the quadrant conditions so that a signal of the appropriate polarity for driving the motor may be applied via the lines 274 and 276 to operate the valve. The program is contained within the micro-processor to apply a discontinuous positive voltage to either one of the lines 274 or 276 and may also adjust the period of discontinuity so as to vary the valve response.

The alarm circuit indicated generally by numeral 312 in FIG. 8F provides an audible signal to the operator in the event that the GPA Percent Error exceeds a predetermined value, e.g., ten percent. It is driven by an output from pin 11 of the micro-processor chip 150 and a single-pole, three position switch having terminals thereof connected to two separate voltages ($V_1$ and $V_4$) is used to control the volume of the "beep" which will be generated. The alarm can be disabled by moving the manual switch to its "off" position.

OPERATION

Distributor 10 operates to dispense a liquid, such as herbicides, insecticides, and fertilizers, onto the soil over the length of spray boom 17. The area covered is the distance traveled by distributor 10 times the width of spray boom 17. The ground speed sensor 44 provides output information or signals indicating the distance traveled by the distributor. This information is utilized by controller 41 to regulate the dispensing of liquid. The liquid, such as water, is initially mixed with chemicals in tank 16. The liquid is withdrawn from tank 16 by pump 24 operated by motor 26. The pump 24 has a conventional adjustable pressure release valve (not shown) to adjust the pressure of the discharge liquid to a selected pressure. Valve 31 is turned to the closed position to block the flow in liquid discharge line 29. The discharge pressure of the liquid of pump 24 is adjusted to a desired level. Valve 31 is then opened to allow the liquid to flow to flow valve and meter assembly 34 and the bypass line 32. When valve 33 is open, the liquid is pumped back into tank 16 to mix and agitate the liquid in tank 16.

The liquid flow rate to boom sections 18, 19, and 20 is controlled by the flow control servo-valve of assembly 34. This controls the amount of liquid that is dispensed through nozzles 21 in boom sections 18, 19, and 20 independent of the ground speed of distributor 10. The density or amount of liquid dispensed is maintained at a substantially uniform rate which has been selected and programmed into controller 41. The density of the liquid dispensed is substantially uniform over a wide range of ground speeds of the distributor. Flow meter 83 provides an output electric signal indicative of the flow rate of liquid through the output line 29. This signal is used by controller 41 to regulate the servo-valve 58.

The pressure of the liquid supplied to the boom sections 18, 19, and 20 is monitored by pressure sensor 36, which transmits an electric signal to the controller 41. Controller 41 is operable to provide a digital readout of the sensed pressure. The pressure of the liquid to all of the boom sections 18, 19, and 20 can be concurrently monitored or selectively monitored. In other words, the pressure supplied to one or more boom sections 18, 19, and 20 can be monitored by shutting off the flow of liquid to one or more boom sections. When one or more of the solenoid operated shut-off valves 38, 39, and 40 are actuated, controller 41 will automatically adjust the flow control valve of assembly 34 to change the flow rate to compensate for the reduced amount of liquid to be dispensed. Thus, when one or more of the boom sections 18, 19, and 20 are shut off, there is not an increase in the dispensing density of liquid from the boom section or sections that have not been turned off. This is accomplished by turning one or more of switches 51, 52, and 53 off. At times a field is finished up with one or two boom sections operating. The controller 41 functions to maintain the desired liquid dispensing rate so that excess liquid is not applied.

Controller switch 119 is a three-position switch which operates in a center manual mode, auto 1 mode, and auto 2 mode. Normally, the switch 118 is in the auto 1 mode, wherein the liquid is dispensed from the boom sections 18, 19, and 20 at a selected low rate. When switch 118 is in the auto 2 mode, the liquid application rate is at a selected high rate. At times, it is necessary to slow distributor 10 down to a very slow speed, such as the end of a row or a rough spot in the terrain. Controller 41 will operate to maintain a constant gallon per acre by lowering the pressure of the liquid in line 29. The pressure of the liquid in line 29 may be lowered below the minimum acceptable to provide an adequate spray from nozzle 22. This will result in inadequate and nonuniform spray density. To avoid this situation, switch 118 is moved to its center or manual position. The servo-valve 58 will be held in a position to maintain minimum pressure of the liquid in line 29, whereby the liquid continues to be dispensed through nozzles 22 even at a very slow rate of speed of distributor 10.

The dispensing rate of the system when switch 118 is in the manual mode can be either increased or decreased with operation of switch 117, regardless of the speed of the distributor 10. This change in dispensing rate can be accomplished without stopping the forward movement of distributor 10.

The actuation of function key 108 triggers the controller micro-processor to display on digital display 107 the actual liquid flow rate in gallons per minute. The display is to the nearest hundredth. This enables a 1 percent display accuracy at very low flow rates. The liquid flow rate information in gallons per minute is useful to check the condition of the distributor. Boom switches 51, 52, and 53 can be selectively operated to check the flow rate in each boom section 18, 19, and 20. Boom sections that have the same number of nozzles have substantially the same liquid flow rate. If the liquid flow rate of the boom sections varies, then one or more of the nozzles are plugged, a solenoid valve is malfunctioning, or a hose is leaking.

The liquid flow rate in each nozzle can be tested with the actuation of function key 108. This is accomplished by plugging one nozzle at a time and noting the change in the gallons per minute visually expressed on digital display 107. The changes of each of the nozzles are compared. Nozzles that are more than 10 percent from the average should be replaced to insure the uniform spray density along the spray boom 17.

Function key 109 is used to display information as to the total acres that have been sprayed. The program automatically corrects for the change in the width of the spray boom sections 18, 19, and 20 when one or more of the boom sections are turned off. When function key 109 is actuated, the program incorporated in controller 41 will automatically run the servo-valve motor 74 to rotate the butterfly valve 58 to a new 90-degree quadrant. This is done to produce even wear on gear train 76A and butterfly disc 58.

Function key 110, GPA percentage error, is used to provide a digital readout on display 107 for the operator to see how close his actual liquid application rate is to the target liquid application rate. The digital readout is the percentage of error between the actual application rate and the target application rate. If the actual rate is equal to the desired rate, the display will show a 0 percentage error. If the actual rate was high by 5 percent, it would display a 5. If the actual rate was low by 7 percent, it would display a $-7$. The programmed control will start making pressure adjustment as soon as the error reaches a plus or minus 1 percent. If the error exceeds 10 percent, the alarm will sound and the GPA percentage error indicated will flash. The control system will then start driving servo-motor 74 to correct the error. Once the error is below 10 percent, the alarm will stop. The alarm can be disabled by turning an alarm volume switch to off.

An increase in the ground speed causes the butterfly valve 58 to open to increase the pressure and flow rate of liquid in line 57 leading to the spray boom sections 18, 19, and 20. If the ground speed continues to increase, the servo-operated butterfly valve 58 will eventually be wide open and no longer able to control the pressure or flow rate of the liquid in the line 57. Pump 24 can only supply a given amount of liquid under a pressure. The operator is warned that he is exceeding the range of the sprayer by a readout or display on display 107 that will flash on and off when the servo butterfly valve 58 is fully opened or fully closed. The ground speed of the distributor 10 is decreased to a speed wherein the controller 41 can regulate the liquid flow rate in line 57.

Function key 111 is operated to show the spray pressure measured adjacent the solenoid operated shut-off valves 38, 39, and 40. The pressure readout on the display 107 is used to control the minimum and maximum ground speed of the vehicle. Minimum and maximum pressure will occur when the butterfly servo-valve 58 is fully opened and fully closed and the display 107 will flash to warn the operator of these conditions. When the ground speed of the vehicle is within the ranges established by the minimum and maximum liquid pressures of the dispensing system, the system will operate to uniformly dispense liquid onto the ground independent of the ground speed of distributor 10.

Function key 112 is used to display the total gallons of liquid that is pumped. When key 112 is operated, the digital information will be displayed on display 107 indicating the total gallons. The system will accumulate the total gallons until this information is cleared. Total gallons is useful in keeping a grand total gallons for a field or a customer.

Function key 113 is used to monitor the gallons of liquid dispensed per acre by the spray boom 17. The gallons per acre of liquid dispensed is maintained automatically by operation of the butterfly servo-valve 58. The target or desired gallons per acre information is programmed in the system with function key 116. Selected gallons per acre can be incorporated in both the auto 1 and the auto 2 rates. The target rates can be changed without stopping distributor 10.

Function key 114, nozzle monitor, is used to warn the operator of a sprayer malfunction, such as a plugged nozzle. Sprayer malfunctions can cause reverse control, resulting in crop damage or poor weed control. The nozzle monitor mode shows sprayer condition by displaying a percentage error on display 107. For example, a plugged nozzle will lower the flow for a given pressure. If the sprayer has 20 nozzles with 1 plugged nozzle, the display will show a $-5$ percent. A reading of $-3$ percent would indicate one nozzle approximately half plugged. The negative sign is used to indicate that the spray boom 17 is putting out less than it should. A leaky hose would cause the flow to be greater than it should be for a given liquid pressure. The nozzle monitor mode would then show a positive percentage error. If the sprayer is operating effectively, it will display a 0 percentage error.

The nozzle monitor percentage error is calculated by response to three conditions. First, it calculates what the flow rate or gallons per minute should be for a measured pressure. The system can accomplish this because a number of nozzles on each boom and the size of each nozzle is programmed into the memory. The actual flow rate is measured by using the flow meter. A comparison between the actual flow rate and the calculated flow rate is made and the percentage of difference is calculated. If the actual flow rate is less than what it should be, then the percentage error is negative. When a condition detects an error greater than + or −10 percent, the alarm will sound a warning and a nozzle monitor indicator light will flash.

The nozzle monitor mode is not affected by ground speed or the width of the spray boom 17. The nozzle monitor mode can be used to check the condition of each boom section 18, 19, and 20 without moving the liquid distributor 10. Each boom section 18, 19, and 20 can be individually tested. The nozzle monitor mode, in addition to checking the condition of the nozzles, also detects malfunctioning of the solenoid operated shut-off valves 38, 39, and 40 and cracked and leaky hoses and clamps connecting the valves 38, 39, and 40 to nozzles 22.

The embodiments of the invention in which an exclusive property or privilege are claimed are defined as follows:

1. An apparatus for dispensing liquid comprising: a tank for storing a liquid, means for supporting the tank for movement relative to the ground, ground speed sensor means operable to provide a first electric signal related to the ground speed of the apparatus, pump means connected to the tank operable to draw liquid from the tank and discharge liquid, boom means having a plurality of nozzles for dispensing liquid onto a desired location, line means connected to the pump means and boom means for carrying liquid under pressure discharged from the pump means to said boom means, means for entering and storing at least one desired flow parameter, a liquid flow meter located in said line means for monitoring the actual flow rate of liquid in said line means, said flow meter including means for producing a second electrical signal related to said flow rate, first valve means located in said line means for controlling the flow rate of liquid in the line means, power means for regulating the first valve means to vary the flow rate of liquid in the line means relative to said actual flow rate and desired flow parameter, means to sense the pressure of the liquid in said line means downstream from said first valve means and provide a third electrical signal related to said second pressure, solenoid operated valve means in said line means adjacent said boom means operable either to allow liquid to flow into the boom means or to block the flow of liquid into the boom means, and control means responsivly coupled to said stored flow parameter and to said first, second and third electrical signals for controlling said power means to regulate the liquid flow rate to the boom means relative to said stored flow parameter and said first and second signals and for independently adjusting the flow rate relative to said second and third electrical signals whereby said liquid is distributed at a substantially uniform spray density independent of speed and pressure variations.

2. The apparatus of claim 1 wherein: said control means has switch means connected to the solenoid operated valve means operable to energize said solenoid operated valve means to block the flow of liquid to the boom means.

3. The apparatus of claim 1 wherein: said boom means has a plurality of separate boom sections, each boom section having a plurality of nozzles, said solenoid operated valve means comprises separate solenoid operated valves connected to each boom section operable to control the flow of liquid to each boom section, said control means having a separate switch means connected to each solenoid operated valve whereby each valve can be operated to cut off the flow of liquid to the boom section associated with the valve.

4. The apparatus of claim 3 wherein: said control means includes means for maintaining a substantially constant liquid spray density at the boom sections that have not been cut off from the liquid whereby the density of the liquid discharged is not increased when one or more boom sections have been cut off from the liquid or when the ground speed has changed.

5. The apparatus of claim 4 wherein: said means to maintain the liquid flow rate to the boom sections includes said liquid flow meter and means for producing said second electrical signal related to the flow rate to said boom sections that have not been cut off from the liquid, said control means having means accommodating said second signal and regulating the flow control valve means to vary the liquid flow rate to compensate for each shut-off boom section.

6. The apparatus of claim 1 wherein: said control means includes means having a switch to control the flow density of liquid to the boom means, said switch having a first position for controlling the flow rate of liquid to the boom means at a selected first flow density, and at least a second position for controlling the flow density of the liquid to the boom means at a selected second flow density, said second flow density being greater than or less than said first flow density.

7. The apparatus of claim 6 wherein: said switch has a third position operable to hold the flow density of liquid to the boom means at a desired constant density independent of the ground speed of the apparatus, and means operable to selectively increase or decrease the flow density when said switch is in its third position.

8. The apparatus of claim 7 wherein: said means operable to selectively increase or decrease the flow rate includes a second switch having a first position to increase the flow rate of liquid to the boom means, and a second position to decrease the flow rate of liquid to the boom means.

9. The apparatus of claim 1 wherein: said control means includes means to control the flow density of liquid to the boom means, said means to control the flow rate of liquid including first selector means having a first position to control the flow density of liquid to the boom means at a selected first flow density and a second position for controlling the flow density of the liquid to the boom means at a selected second flow density, said second flow density being greater than said first flow density.

10. The apparatus of claim 9 wherein: said first selector means has a third position operable to hold the flow rate of liquid to the boom means at a desired rate independent of the ground speed of the apparatus, and means operable to selectively increase or decrease the flow rate when said selector means is in its third position.

11. The apparatus of claim 10 wherein: said means operable to selectively increase or decrease the flow density includes a second selector means having a first position to increase the flow density of liquid to the boom means, and a second position to decrease the flow density of liquid to the boom means.

12. The apparatus of claim 11 wherein: the first selector means is a three-position switch and said second selector means is a three-position switch.

13. The apparatus of claim 1 wherein: said control means includes alarm means operable to provide a signal indicating to the operator that the flow density of the liquid in the line means has exceeded a first preset limit or has dropped below a second preset limit.

14. The apparatus of claim 1 wherein: said first valve means includes body means having a passage connected to said line means for carrying liquid, a butterfly valve member located in said passage for controlling the flow of liquid through said passage thereby controlling the flow of liquid to said boom means, means movably mounting the valve member on said body means for movement between a plurality of open positions and a plurality of closed positions, said power means being connected to said valve member operable to move the valve member between a plurality of open and closed positions, said control means being operable to regulate the operation of the power means to move the valve member between one open and one closed position, and subsequently move the valve member between other open and closed positions.

15. The apparatus of claim 14 wherein: said power means includes an electric motor and gear means connecting the motor to said butterfly valve member whereby operation of said motor controls the position of the butterfly valve member to regulate the flow rate of liquid through said passage, said control means including means for controlling the duration and direction of operation of said motor.

16. The apparatus of claim 15 wherein: the butterfly valve member rotates about 90 degrees between each of its open and closed positions, said valve member rotating in a different 90-degree arc for each open and closed position thereof.

17. The apparatus of claim 1 wherein: said stored flow parameter comprises target gallons per acre of liquid desired to be dispensed by the boom means, and said control means includes means to determine the actual gallons per acre of liquid dispensed by the boom means, and means for determining the percent of error between the actual gallons per acre dispensed by the boom means and the target gallons per acre.

18. The apparatus of claim 17 including: visual display means operable to display the percent of error between the actual gallons per acre and the target gallons per acre.

19. The apparatus of claim 17 wherein: said control means includes means operable to increase the speed of operation of the power means in proportion to the increase in the percent of error between the actual gallons per acre and the target gallons per acre thereby increasing the speed of operation of the valve means as the percent of error increases.

20. The apparatus of claim 1 wherein: said stored flow parameter comprises target gallons per acre of liquid desired to be dispensed by the boom means and said control means includes means to determine the actual gallons per acre of liquid dispensed by the boom means, means for determining the percent of error between the actual gallons per acre and the target gallons per acre, visual display means operable to display the percent of error between the actual gallons per acre and the target gallons per acre, alarm means operable when the percent of error goes above a selected percent or falls below a selected percent, and means operable to increase the speed of operation of the power means in proportion to an increase in the percent of error between the actual gallons per acre and the target gallons per acre thereby increasing the speed of operation of the valve means in proportion to an increase in the percent of error between the actual gallons per acre and the target gallons per acre.

21. The apparatus of claim 1 wherein said control means is selectively operable to monitor the pressure in said line means by comparing said second signal to a flow rate determined from said third signal and relative to first and second preset limits.

22. Apparatus as set forth in claim 21 including means for storing data corresponding to the number and spacing between and the spray orifice size of each of said dispensing nozzles and wherein said processing means relative to a theoretical flow rate determined from said data and said pressure control signal and said actual flow rate control signal controls said valve means independent of the ground speed or boom width.

23. An apparatus for dispensing liquid onto a desired location comprising:
means movable relative to the ground for storing a liquid, ground speed sensor means operable to provide a first signal related to the ground speed of the apparatus, pump means connected to the means for storing the liquid operable to pump said liquid, liquid dispensing means having a plurality of nozzles for dispensing liquid onto a desired location, line means connected to the pump means and dispensing means for carrying liquid under pressure discharged from the pump means to said dispensing means, a liquid flow meter located in said line means for monitoring the flow rate of liquid in said line means, said flow meter including means for producing a second signal related to said flow rate, liquid flow control valve means located in said line means, power means for regulating the valve means to vary the flow rate of liquid in the line means, means to sense the pressure of the liquid in said line means downstream from said liquid flow control valve means and provide a third electrical signal related to said sensed pressure, and control means responsively coupled to said stored flow parameter and to said first, second and third electrical signals for controlling said power means to regulate the liquid flow rate to the boom means relative to said stored flow parameter and said first and second signals and for independently adjusting the flow rate relative to said second and third electrical signals whereby said liquid is distributed at a substantially uniform spray density independent of speed and pressure variations, said control means including selector means to select the flow density of liquid supplied to the dispensing means, said selector means having a first position for controlling the flow density of liquid to the dispensing means at a selected first flow density, and at least a second position for controlling the flow density of the liquid to the dispensing means at a second selected flow density, said second flow density being greater than or less than said first flow density.

24. The apparatus of claim 23 wherein: said selector means has a third position operable to hold the flow density of the liquid to the dispensing means at a desired density independent of the ground speed of the apparatus, and means operable to selectively increase or decrease the flow density when said selector means is in its third position.

25. The apparatus of claim 24 wherein: said means operable to selectively increase or decrease the flow density includes second selector means having a first position to increase the flow density of liquid to the dispensing means, and a second position to decrease the flow density of liquid to the dispensing means.

26. The apparatus of claim 25 wherein: said first selector means is a three-position switch and said second selector means is a three position switch.

27. The apparatus of claim 23 wherein: said control means includes means to determine the actual gollons per acre of liquid dispensed by the dispensing means at each of the selectable flow densities and means for determining the percent of error between the actual gallons per acre dispensed by the boom means and the gallons per acre of each of said selectable flow densities.

28. The apparatus of claim 27 including: visual display means operable to display the percent of error between the actual gallons per acre and the target gallons per acre at each of said flow rates.

29. The apparatus of claim 27 wherein: said control means includes means operable to increase the speed of operation of the power means in proportion to the increase in the percent of error between the actual gallons per acre and the selected target gallons per acre at each of said first and second flow densities thereby increasing the speed of operation of the valve means as the percent of error increases for each flow density.

30. The apparatus of claim 23 wherein: said control means includes means to determine the actual gallons per acre of liquid dispensed by the dispensing means at each of the selectable flow densities, means for storing information as to target gallons per acre of liquid desired to be dispensed by the dispensing means at each of the selectable flow rates, emans for determining the percent of error between the actual gallons per acre and the gallons per acre at each of the selectable flow densities, visual display means operable to display the percent of error between the actual gallons per acre and the gallons per acre at each of the selectable flow densities, alarm means operable when the percent of error goes above a selected percent or falls below a selected percent, and means operable to increase the speed of operation of the power means in proportion to an increase in the percent of error between the actual gallons per acre and the gallons per acre at each selectable flow density thereby increasing the speed of operation of the valve means in proportion to an increase in the percent of error between the actual gallons per acre and the gallons per acre at each selectable flow density.

31. The apparatus of claim 23 wherein: said liquid flow control valve means includes a passage in said line means for carrying liquid, a valve member located in said passage for controlling the flow of liquid through said passage thereby controlling the flow of liquid to said dispensing means, means movably mounting the valve member for movement between a plurality of open positions and a plurality of closed positions, said power means being connected to said valve member operable to move the valve member between a plurality of open and closed positions, said control means being operable to regulate the operation of the power means to move the valve member between one open position and one closed position, and subsequently move the valve member between other open and closed positions.

32. The apparatus of claim 31 wherein: the valve member rotates about 90 degrees between each of its open and closed positions, said valve member being rotated in a different 90-degree arc for each open and closed position thereof.

33. The apparatus of claim 32 wherein: said power means includes an electric motor and gear means connecting the electric motor to said valve member whereby operation of said motor controls the position of the valve member to regulate the flow of liquid through said passage, said control means including means for controlling the duration and direction of operation of said motor.

34. An apparatus for dispensing liquid onto a desired location comprising: means relative to the ground for storing a liquid, ground speed sensor means operable to provide a first signal related to the ground speed of the apparatus, pump means connected to the means for storing the liquid operable to pump liquid, boom means having a plurality of nozzles for dispensing liquid onto a desired location, said boom means having a plurality of boom sections, each boom section having a plurality of nozzles for dispensing onto said desired location, line means connected to the pump means and boom means for carrying liquid under pressure discharged from the pump means to each of said boom sections, a liquid flow meter located in said line means for monitoring the flow rate of liquid in said line means, said flow meter including means for producing a second signal related to said flow rate, liquid flow control valve means located in said line means for controlling the flow rate of liquid in the line means, power means for regulating the flow control valve means to vary the flow rate of liquid in the line means, means to sense the pressure of the liquid in said line means downstream from said liquid flow control valve means and provide a third electrical signal related to said sensed pressure, a plurality of solenoid operated valve means in said line means adjacent said boom sections operable to allow liquid to flow into each boom section and separately cut off the flow of liquid to each boom section, and control means responsively coupled to said stored flow parameter and to said first, second and third electrical signals for controlling said power means to regulate the liquid flow rate to the boom means relative to said stored flow parameter and said first and second signals and for independently adjusting the flow rate relative to said second and third electrical signals whereby said liquid is distributed at a substantially uniform spray density independent of speed and pressure variations, said control means having a plurality of switch means operably connected to the plurality of solenoid operated valve means for selectively coupling the solenoid operated valve means to a source of electric power, said switch means being selectively and individually operable to energize one or more of said solenoid operated valve means to cut off the flow of liquid to one or more of said boom sections, said control means including means to maintain a substantially constant liquid flow density to the boom sections that have not been cut off from the liquid whereby the density of the liquid discharged is not increased when one or more boom sections have been cut off from the liquid or when the ground speed has changed.

35. The apparatus of claim 34 wherein: said means to maintain the liquid flow density to the boom sections includes said liquid flow meter and said means for producing a second signal related to said flow rate, said control means utilizing said second signal in relation to said third signal to control the power means to regulate the flow control valve means to adjust the flow rate of liquid in the line means to compensate for the liquid cut off to each boom section.

36. The apparatus of claim 34 wherein: said control means includes means to determine the actual gallons per acre of liquid dispensed by the boom means, means for storing information as to gallons per acre of liquid desired to be dispensed by the boom means and means for determining the percent of error between the actual gallons per acre dispensed by the boom means and the desired gallons per acre.

37. The apparatus of claim 35 including: visual display means operable to display the percent of error between the actual gallons per acre and the target gallons per acre.

38. The apparatus of claim 36 wherein: said control means includes means operable to increase the speed of operation of the power means in proportion to the increase in the percent of error between the actual gallons per acre and the target gallons per acre thereby increasing the speed of operation of the valve means as the percent of error of the flow density increases.

39. The apparatus of claim 34 wherein: said control means includes means to determine the actual gallons per acre of liquid dispensed by the boom means, means for storing information as to gallons per acre of liquid desired to be dispensed by the boom means, means for determining the percentage of error between the actual gallons per acre and the target gallons per acre, visual display means operable to display the present of error between the actual gallons per acre and the target gallons per acre at each of the flow rates, alarm means operable when the percent of error goes above a selected percent or falls below a selected percent, and means operable to increase the speed of operation of the power means is proportion to an increase in the percentage error between the actual gallons per acre and the desired gallons per acre thereby increasing the speed of operation of the valve means in proportion to an increase in the percentage of error between the actual gallons per acre and the desired gallons per acre.

40. An apparatus for dispensing liquid onto a desired location comprising: means movable relative to the ground for storing a liquid, ground speed sensor means operable to provide a first signal related to the ground speed of the apparatus, pump means connected to the means for storing the fluid operable to pump liquid, a plurality of boom sections for dispensing liquid onto said desired location, each boom section having a plurality of nozzles for dispensing liquid, line means connected to the pump means and boom sections for carrying liquid under pressure discharged by the pump means to each boom section, liquid flow control valve means located in said line means for controlling the flow rate of liquid and pressure in the line means leading to the boom sections, power means for regulating the flow control valve means to vary the flow rate of liquid and pressure in the line means, means to sense the flow rate in the line means and provide a second signal related to the sensed flow rate, means to sense the pressure of the liquid in said line means downstream from said liquid flow control valve means and provide a third electrical signal related to said sensed pressure, a plurality of solenoid operated valve means in said line means adjacent said boom sections operable to allow liquid to flow into each boom section and separately cut off the flow of liquid to each boom section, and control means responsively coupled to said stored flow parameter and to said first, second and third electrical signals for controlling said pwoer means to regulate the liquid flow rate to the boom means relative to said stored flow parameter and said first and second signals and for independently adjusting the flow rate relative to said second and third electrical signals whereby said liquid is distributed at a substantially uniform spray density independent of speed and pressure variations, said control means having a pluralty of switch means operably connected to the plurality of solenoid operated valve means for selectively coupling the solenoid operated valve means to a source of electric power, said switch means being selectively and individually operable to energize one or more of said solenoid operated valve means to cut off the flow of liquid to one or more of said boom sections, said control means including means to maintain the liquid flow density to the boom sections that have not been cut off from the liquid substantially constant whereby the density of the liquid discharged is not increased when one or more boom sections have been cut off from the liquid or when the ground speed has changed.

41. An apparatus for dispensing liquid onto a desired location comprising: means movable relative to the ground for storing a liquid, ground speed sensor means operable to provide a first signal related to the ground speed of the apparatus, pump means connected to the means for storing the liquid operable to pump said liquid, liquid dispensing means for dispensing liquid onto a desired location, line means connected to the pump means and dispensing means for carrying liquid under pressure discharged by the pump means to the dispensing means, a liquid flow meter located in said line means for monitoring the flow rate of liquid in said line means, said flow meter including means for producing a second electric signal related to said flow rate, liquid flow control valve means located in said line means, power means for regulating the valve means to vary the flow rate of liquid in the line means, means to sense the pressure of the liquid in said line means downstream from said liquid flow control valve means and provide a third electrical signal related to said sensed pressure, and control means responsively coupled to said stored flow parameter and to said first, second and third electrical signals for controlling said power means to regulate the liquid flow rate to the boom means relative to said stored flow parameter and said first and second signals and for independently adjusting the flow rate relative to said second and third electrical signals whereby said liquid is distributed at a substantially uniform spray density independent of speed and pressure variations, said control means including means to determine the actual gallons per acre of liquid dispensed by the dispensing means, means for storing information as to gallons per acre of liquid desired to be dispensed by the dispensing means, and means for determining the percentage of error between the actual gallons per acre and the desired gallons per acre.

42. The apparatus of claim 41 including: means operable to increase the speed of operation of the power means in proportion to an increase in the percentage of error between the actual gallons per acre and the desired gallons per acre, thereby increasing the speed of operation of the valve means.

43. The apparatus of claim 41 wherein: said controller includes visual display means operable to display the percentage error between the actual gallons per acre and the desired gallons per acre.

44. The apparatus of claim 41 including: alarm means operable when the percent of error goes above a selected percent or falls below a selected percent.

45. Improved liquid spray dispensing apparatus having a tank for storing a liquid, means for supporting the tank for movement relative to the ground, ground speed sensor means operable to provide a first control signal related to the ground speed of the apparatus, pump means connected to the tank operable to draw liquid from the tank and discharge liquid, boom means having a plurality of nozzles for dispensing liquid onto a desired location, line means connected to the pump means and boom means for carrying liquid under pressure discharged from the pump means to said boom means, a liquid flow meter located in said line means for monitoring the flow rate of liquid in said line means, said flow meter including means for producing a second control signal related to said flow rate, first valve means located in said line means for controlling the flow rate of liquid in the line means, power means for regulating the first valve means to vary the flow rate of liquid in the line means, and means to sense the pressure of the liquid in said line means downstream from said first valve means and provide a third control signal related to said sensed pressure, the improvement comprising: means for entering and storing a desired flow density; control means response to said stored flow density and to said first and second control signals for controlling said power means to regulate the liquid flow rate to said boom so that said desired density is dispensed from the nozzles in a substantially uniform manner and for independently monitoring said third control signal relative to said second control signal and controlling said power means relative to detected variations in the flow density.

46. The apparatus of claim 45 wherein said control means includes at least a first and second predetermined limit of variation between the desired flow density and actual flow density and means proportionately varying the rate of response to said power means with the magnitude of variation.

47. The apparatus of claim 45 wherein said boom means includes a plurality of separately controlled boom sections, each boom section having a plurality of nozzles and each having a solenoid operated valve for controlling the liquid flow thereto, and wherein said control means upon detecting a change in said third control signal with the turning on or off of flow to one or more of said boom sections independently controls said power means to regulate said valve means and flow rate to maintain said desired density independent of the apparatus ground speed.

48. Improved apparatus for distributing a pressurized liquid from a portable storage tank via a plurality of boom mounted dispensing nozzles, the improvement comprising in combination:

means for entering and storing a least one desired flow parameter control signal;

means for monitoring the liquid flow rate to said dispensing nozzles and producing a flow rate control signal;

means for monitoring the ground speed of said storage tank for producing a ground speed control signal;

means for monitoring the pressure at which said liquid is supplied to said boom and producing a corresponding control signal;

valve means for controlling the flow rate of liquid to said boom;

processing means responsive to said control signals for controlling said valve means relative to determined variations between said stored flow parameter and a corresponding actual flow parameter as determined from said ground speed and flow rate control signal and for independently varying the flow rate relative to sensed variations between a flow rate relative to sensed variations between a flow rate determined from said pressure control signal and the actual flow rate.

49. Apparatus as set forth in claim 48 wherein said valve means comprises a motor driven, pivoting butterfly valve having a plurality of flow regulating positions, 50. Apparatus as set forth in claim 49 wherein said processing means includes means for periodically varying the position of said butterfly valve between ones of said flow regulating positions, independent of and while maintaining a determined flow rate, so as to distribute resultant wear induced on said valve means.

51. Apparatus as set forth in claim 48 wherein said processing means includes means for varying the speed of response of said valve means depending upon the magnitude of the variation between said stored flow parameter the determined actual flow parameter.

* * * * *

UNITED STATES PATENT AND TRADEMARK OFFICE
CERTIFICATE OF CORRECTION

PATENT NO. : 4,530,463
DATED : July 23, 1985
INVENTOR(S) : Thomas K. Hiniker and Vincent N. Bush It is certified that error appears in the above-identified patent and that said Letters Patent is hereby corrected as shown below:

Column 21, line 14, "gollons" should be --gallons--.

Column 21, line 40, "emans" should be --means--.

Column 23, line 39, "is" should be --in--.

Column 24, line 5, "pwoer" should be --power--.

Column 24, line 12, "pluralty" should be --plurality--.

Column 26, line 35, "," should be --.--.

Signed and Sealed this

Fifth Day of November 1985

[SEAL]

Attest:

DONALD J. QUIGG

Attesting Officer

Commissioner of Patents and Trademarks